US011086053B2

(12) United States Patent
Banerjee et al.

(10) Patent No.: US 11,086,053 B2
(45) Date of Patent: Aug. 10, 2021

(54) NON-COLOR SHIFTING MULTILAYER STRUCTURES

(71) Applicants: Toyota Motor Engineering & Manufacturing North America, Inc., Erlanger, KY (US); Toyota Jidosha Kabushiki Kaisha, Toyota (JP)

(72) Inventors: Debasish Banerjee, Ann Arbor, MI (US); Minjuan Zhang, Ann Arbor, MI (US); Masahiko Ishii, Okazaki (JP)

(73) Assignees: Toyota Motor Engineering & Manufacturing North America, Inc., Plano, TX (US); Toyota Jidosha Kabushiki Kaisha

( * ) Notice: Subject to any disclaimer, the term of this patent is extended or adjusted under 35 U.S.C. 154(b) by 0 days.

(21) Appl. No.: 15/722,514

(22) Filed: Oct. 2, 2017

(65) Prior Publication Data
US 2018/0045865 A1    Feb. 15, 2018

Related U.S. Application Data

(63) Continuation of application No. 14/242,429, filed on Apr. 1, 2014, now Pat. No. 10,788,608.

(51) Int. Cl.
*G02B 5/08* (2006.01)
*G02B 5/28* (2006.01)
*G02B 5/26* (2006.01)

(52) U.S. Cl.
CPC ............ *G02B 5/0858* (2013.01); *G02B 5/085* (2013.01); *G02B 5/26* (2013.01); *G02B 5/285* (2013.01); *G02B 5/286* (2013.01)

(58) Field of Classification Search
CPC .... G02B 5/1861; G02B 5/0858; G02B 5/085; G02B 5/26; G02B 5/286; G02B 5/285; B42D 25/29
(Continued)

(56) References Cited

U.S. PATENT DOCUMENTS

| 3,247,392 A | 4/1966 | Thelen |
| 3,650,790 A | 3/1972 | Klenke et al. |

(Continued)

FOREIGN PATENT DOCUMENTS

| CN | 1313953 A | 9/2001 |
| CN | 1471562 A | 1/2004 |

(Continued)

OTHER PUBLICATIONS

Office Action dated Sep. 5, 2018 pertaining to Japanese Patent Application No. 2014-117702.
(Continued)

*Primary Examiner* — Audrey Y Chang
(74) *Attorney, Agent, or Firm* — Dinsmore & Shohl LLP

(57) ABSTRACT

An omnidirectional multilayer thin film is provided. The multilayer thin film includes a multilayer stack having a first layer of a first material and a second layer of a second material, the second layer extending across the first layer. The multilayer stack reflects a narrow band of electromagnetic radiation having a full width at half maximum (FWHM) of less than 300 nanometers (nm) and a color of less than 50 nm when the multilayer stack is exposed to broadband electromagnetic radiation and viewed from angles between 0 and 45 degrees. In some instances, the multilayer stack has a total thickness of less than 2 microns (μm). Preferably, the multilayer thin film has a total thickness of less than 1.5 μm and more preferably less than 1.0 μm.

10 Claims, 14 Drawing Sheets

(58) Field of Classification Search
USPC ......... 359/586, 584; 106/403, 404; 428/403; 283/91
See application file for complete search history.

(56) References Cited

U.S. PATENT DOCUMENTS

| | | | |
|---|---|---|---|
| 3,769,515 A | 10/1973 | Clark, Jr. | |
| 3,885,408 A | 5/1975 | Clark, Jr. | |
| 3,910,681 A | 10/1975 | Elliott et al. | |
| 3,953,643 A | 4/1976 | Cheung et al. | |
| 4,079,605 A | 3/1978 | Bartels | |
| 4,449,126 A | 5/1984 | Pekker | |
| 4,525,028 A | 6/1985 | Dorschner | |
| 4,544,415 A | 10/1985 | Franz et al. | |
| 4,556,599 A | 12/1985 | Sato et al. | |
| 4,613,622 A | 9/1986 | Moeller et al. | |
| 4,643,518 A | 2/1987 | Taniguchi | |
| 4,673,914 A | 6/1987 | Lee | |
| 4,705,839 A | 11/1987 | Martin | |
| 4,714,308 A | 12/1987 | Sawamura et al. | |
| 4,753,829 A | 6/1988 | Panush | |
| 4,756,602 A | 7/1988 | Southwell et al. | |
| 4,868,559 A | 9/1989 | Pinnow | |
| 4,896,928 A | 1/1990 | Perilloux et al. | |
| 4,930,866 A * | 6/1990 | Berning | B42D 25/29 283/91 |
| 4,996,105 A | 2/1991 | Oyama et al. | |
| 5,007,710 A | 4/1991 | Nakajima et al. | |
| 5,043,593 A | 8/1991 | Tsutsumi et al. | |
| RE33,729 E | 10/1991 | Perilloux | |
| 5,132,661 A | 7/1992 | Pinnow | |
| 5,138,468 A | 8/1992 | Barbanell | |
| 5,183,700 A | 2/1993 | Austin | |
| 5,214,530 A | 5/1993 | Coombs et al. | |
| 5,245,329 A | 9/1993 | Gokcebay | |
| 5,279,657 A | 1/1994 | Phillips et al. | |
| 5,283,431 A | 2/1994 | Rhine | |
| 5,323,416 A | 6/1994 | Bhat et al. | |
| 5,410,431 A | 4/1995 | Southwell | |
| 5,423,912 A | 6/1995 | Sullivan et al. | |
| 5,424,119 A | 6/1995 | Phillips et al. | |
| 5,437,931 A | 8/1995 | Tsai et al. | |
| 5,472,798 A | 12/1995 | Kumazawa et al. | |
| 5,491,470 A | 2/1996 | Veligdan | |
| 5,522,923 A | 6/1996 | Kimura et al. | |
| 5,543,665 A | 8/1996 | Demarco | |
| 5,561,420 A | 10/1996 | Kleefeldt et al. | |
| 5,569,332 A | 10/1996 | Glatfelter et al. | |
| 5,569,353 A | 10/1996 | Zodrow | |
| 5,569,535 A | 10/1996 | Phillips et al. | |
| 5,570,847 A | 11/1996 | Phillips et al. | |
| 5,571,624 A | 11/1996 | Phillips et al. | |
| 5,624,486 A | 4/1997 | Schmid et al. | |
| 5,653,792 A | 8/1997 | Phillips et al. | |
| 5,691,844 A | 11/1997 | Oguchi et al. | |
| 5,700,550 A | 12/1997 | Uyama et al. | |
| 5,759,255 A | 6/1998 | Venturini et al. | |
| 5,768,026 A | 6/1998 | Kiyomoto et al. | |
| 5,850,309 A | 12/1998 | Shirai et al. | |
| 5,889,603 A | 3/1999 | Roddy et al. | |
| 5,982,078 A | 11/1999 | Krisl et al. | |
| 6,049,419 A | 4/2000 | Wheatley et al. | |
| 6,055,079 A | 4/2000 | Hagans et al. | |
| 6,130,780 A | 10/2000 | Joannopoulos et al. | |
| 6,150,022 A | 11/2000 | Coulter et al. | |
| 6,156,115 A | 12/2000 | Pfaff et al. | |
| 6,157,480 A | 12/2000 | Anderson et al. | |
| 6,157,489 A | 12/2000 | Bradley, Jr. et al. | |
| 6,157,498 A | 12/2000 | Takahashi | |
| 6,164,777 A | 12/2000 | Li et al. | |
| 6,180,025 B1 | 1/2001 | Schoenfeld et al. | |
| 6,215,592 B1 | 4/2001 | Pelekhaty | |
| 6,242,056 B1 | 6/2001 | Spencer et al. | |
| 6,243,204 B1 | 6/2001 | Bradley, Jr. et al. | |
| 6,246,523 B1 | 6/2001 | Bradley, Jr. et al. | |
| 6,249,378 B1 | 6/2001 | Shimamura et al. | |
| 6,310,905 B1 | 10/2001 | Shirai | |
| 6,331,914 B1 | 12/2001 | Wood, II et al. | |
| 6,383,638 B1 | 5/2002 | Coulter et al. | |
| 6,387,457 B1 | 5/2002 | Jiang et al. | |
| 6,387,498 B1 | 5/2002 | Coulter et al. | |
| 6,399,228 B1 | 6/2002 | Simpson | |
| 6,433,931 B1 | 8/2002 | Fink et al. | |
| 6,451,414 B1 | 9/2002 | Wheatley et al. | |
| 6,475,273 B1 | 11/2002 | Zimmermann et al. | |
| 6,534,903 B1 | 3/2003 | Spiro et al. | |
| 6,565,770 B1 * | 5/2003 | Mayer | B82Y 10/00 106/403 |
| 6,569,527 B1 | 5/2003 | Calhoun et al. | |
| 6,574,383 B1 | 6/2003 | Erchak et al. | |
| 6,582,764 B2 | 6/2003 | Fuller et al. | |
| 6,596,070 B1 | 7/2003 | Schmidt et al. | |
| 6,618,149 B1 | 9/2003 | Stirton | |
| 6,624,945 B2 | 9/2003 | Fan et al. | |
| 6,667,095 B2 | 12/2003 | Wheatley et al. | |
| 6,686,042 B1 * | 2/2004 | LeGallee | B32B 7/02 106/404 |
| 6,699,313 B2 | 3/2004 | Coulter et al. | |
| 6,753,952 B1 | 6/2004 | Lawrence et al. | |
| 6,841,238 B2 | 1/2005 | Argoitia et al. | |
| 6,844,976 B1 | 1/2005 | Firon et al. | |
| 6,873,393 B2 | 3/2005 | Ma | |
| 6,887,526 B1 | 5/2005 | Arlt et al. | |
| 6,894,838 B2 | 5/2005 | Mizrahi et al. | |
| 6,903,873 B1 | 6/2005 | Joannopoulos et al. | |
| 6,913,793 B2 | 7/2005 | Jiang et al. | |
| 6,927,900 B2 | 8/2005 | Liu et al. | |
| 6,997,981 B1 | 2/2006 | Coombs et al. | |
| 7,049,003 B2 | 5/2006 | Thomsen et al. | |
| 7,052,762 B2 | 5/2006 | Hebrink et al. | |
| 7,064,897 B2 | 6/2006 | Hebrink et al. | |
| 7,098,257 B2 | 8/2006 | Rink et al. | |
| 7,106,516 B2 | 9/2006 | Lotz et al. | |
| 7,123,416 B1 | 10/2006 | Erdogan et al. | |
| 7,141,297 B2 | 11/2006 | Condo et al. | |
| 7,169,472 B2 | 1/2007 | Raksha et al. | |
| 7,184,133 B2 | 2/2007 | Coombs et al. | |
| 7,190,524 B2 | 3/2007 | Grawert et al. | |
| 7,215,473 B2 | 5/2007 | Fleming | |
| 7,236,296 B2 | 6/2007 | Liu et al. | |
| 7,267,386 B2 | 9/2007 | Hesch | |
| 7,326,967 B2 | 2/2008 | Hsieh et al. | |
| 7,329,967 B2 | 2/2008 | Nozawa et al. | |
| 7,352,118 B2 | 4/2008 | Chowdhury et al. | |
| 7,367,691 B2 | 5/2008 | Lin | |
| 7,410,685 B2 | 8/2008 | Rosenberger et al. | |
| 7,413,599 B2 | 8/2008 | Henglein et al. | |
| 7,446,142 B2 | 11/2008 | Meisenburg et al. | |
| 7,452,597 B2 | 11/2008 | Bujard | |
| 7,483,212 B2 | 1/2009 | Cho et al. | |
| 7,638,184 B2 | 12/2009 | Yaoita et al. | |
| 7,667,895 B2 | 2/2010 | Argoitia et al. | |
| 7,699,350 B2 | 4/2010 | Heim | |
| 7,699,927 B2 | 4/2010 | Henglein et al. | |
| 7,745,312 B2 | 6/2010 | Herner et al. | |
| 7,847,342 B2 | 12/2010 | Fukuzumi et al. | |
| 7,851,580 B2 | 12/2010 | Li et al. | |
| 7,859,754 B2 | 12/2010 | Falicoff | |
| 7,863,672 B2 | 1/2011 | Jin et al. | |
| 7,903,339 B2 | 3/2011 | Banerjee et al. | |
| 7,929,730 B2 | 4/2011 | Huang et al. | |
| 7,980,711 B2 | 7/2011 | Takayanagi et al. | |
| 3,013,383 A1 | 9/2011 | Kidoh et al. | |
| 8,257,784 B2 | 9/2012 | Grayson et al. | |
| 8,313,798 B2 | 11/2012 | Nogueira et al. | |
| 8,323,391 B2 | 12/2012 | Banerjee et al. | |
| 8,329,247 B2 | 12/2012 | Banerjee et al. | |
| 8,350,314 B2 | 1/2013 | Fukuzumi et al. | |
| 8,440,014 B2 | 5/2013 | Kitamura et al. | |
| 8,446,666 B2 | 5/2013 | Kurt et al. | |
| 8,542,441 B2 | 9/2013 | Ouderkirk et al. | |
| 8,593,728 B2 | 11/2013 | Banerjee et al. | |
| 8,599,464 B2 | 12/2013 | Park | |
| 8,619,365 B2 | 12/2013 | Harris et al. | |

(56) References Cited

U.S. PATENT DOCUMENTS

| | | |
|---|---|---|
| 8,736,959 B2 | 5/2014 | Grayson et al. |
| 9,063,291 B2 | 6/2015 | Banerjee et al. |
| 2001/0022151 A1 | 9/2001 | Sliwinski et al. |
| 2002/0030882 A1 | 3/2002 | Vitt et al. |
| 2002/0096087 A1 | 7/2002 | Glausch |
| 2002/0117080 A1 | 8/2002 | Okutsu et al. |
| 2002/0129739 A1 | 9/2002 | Yanagimoto et al. |
| 2003/0002157 A1 | 1/2003 | Someno |
| 2003/0059549 A1 | 3/2003 | Morrow et al. |
| 2003/0190473 A1* | 10/2003 | Argoitia ............... G02B 5/1861 428/403 |
| 2004/0047055 A1 | 3/2004 | Mizrahi et al. |
| 2004/0156984 A1 | 8/2004 | Vitt et al. |
| 2004/0179267 A1 | 9/2004 | Moon et al. |
| 2004/0191540 A1 | 9/2004 | Jakobi et al. |
| 2004/0246477 A1 | 12/2004 | Moon et al. |
| 2004/0252509 A1 | 12/2004 | Lin |
| 2004/0263983 A1 | 12/2004 | Acree |
| 2004/0265477 A1 | 12/2004 | Nabatova-Gabain et al. |
| 2005/0126441 A1 | 6/2005 | Skelhorn |
| 2005/0127840 A1 | 6/2005 | Chowdhury et al. |
| 2005/0132929 A1 | 6/2005 | Raksha et al. |
| 2005/0152417 A1 | 7/2005 | Lin |
| 2005/0235714 A1 | 10/2005 | Lindstrom |
| 2005/0264874 A1 | 12/2005 | Lin |
| 2006/0006402 A1 | 1/2006 | Hsieh et al. |
| 2006/0023327 A1 | 2/2006 | Coombs et al. |
| 2006/0030656 A1 | 2/2006 | Tarng et al. |
| 2006/0081858 A1 | 4/2006 | Lin et al. |
| 2006/0145172 A1 | 7/2006 | Su et al. |
| 2006/0155007 A1 | 7/2006 | Huber |
| 2006/0159922 A1 | 7/2006 | O'Keefe |
| 2006/0222592 A1 | 10/2006 | Burda |
| 2007/0097509 A1 | 5/2007 | Nevitt et al. |
| 2007/0221097 A1 | 9/2007 | Tarng et al. |
| 2009/0046368 A1 | 2/2009 | Banerjee et al. |
| 2009/0082659 A1 | 3/2009 | Ham et al. |
| 2009/0153953 A1 | 6/2009 | Banerjee et al. |
| 2009/0161220 A1 | 6/2009 | Banerjee et al. |
| 2009/0196319 A1 | 8/2009 | Hori et al. |
| 2009/0241802 A1 | 10/2009 | Nemoto et al. |
| 2009/0303044 A1 | 12/2009 | Furuichi et al. |
| 2009/0321693 A1 | 12/2009 | Ohkuma et al. |
| 2010/0064938 A1 | 3/2010 | Voit et al. |
| 2010/0208338 A1 | 8/2010 | Banerjee et al. |
| 2010/0209593 A1 | 8/2010 | Banerjee et al. |
| 2010/0213485 A1 | 8/2010 | McKenzie et al. |
| 2011/0014366 A1 | 1/2011 | Nogueira et al. |
| 2011/0091658 A1 | 4/2011 | Banerjee et al. |
| 2011/0113984 A1 | 5/2011 | Fuller, Jr. et al. |
| 2011/0128616 A1 | 6/2011 | Banerjee et al. |
| 2011/0134515 A1 | 6/2011 | Banerjee et al. |
| 2011/0214733 A1 | 9/2011 | den Boer et al. |
| 2011/0228399 A1 | 9/2011 | Ohnishi |
| 2011/0266879 A1 | 11/2011 | Kim et al. |
| 2011/0267247 A1 | 11/2011 | Choi et al. |
| 2011/0299154 A1 | 12/2011 | Grayson et al. |
| 2012/0015056 A1 | 1/2012 | Lee |
| 2012/0050848 A1 | 3/2012 | Carlson et al. |
| 2012/0107584 A1 | 5/2012 | Eibon et al. |
| 2012/0153527 A1 | 6/2012 | Banerjee et al. |
| 2012/0307369 A1 | 12/2012 | Banerjee et al. |
| 2013/0148221 A1 | 6/2013 | Banerjee et al. |
| 2013/0213260 A1 | 8/2013 | Kunii |
| 2013/0250403 A1 | 9/2013 | Maeda |
| 2013/0265668 A1 | 10/2013 | Banerjee et al. |
| 2014/0018439 A1 | 1/2014 | Gruner et al. |
| 2014/0111861 A1 | 4/2014 | Banerjee et al. |
| 2014/0211303 A1 | 7/2014 | Banerjee et al. |
| 2014/0368918 A1 | 12/2014 | Banerjee et al. |
| 2015/0033988 A1 | 2/2015 | Wu et al. |
| 2015/0138641 A1 | 5/2015 | Delst et al. |
| 2015/0138642 A1 | 5/2015 | Banerjee et al. |
| 2015/0309231 A1 | 10/2015 | Banerjee |
| 2015/0309232 A1 | 10/2015 | Banerjee |

FOREIGN PATENT DOCUMENTS

| | | |
|---|---|---|
| CN | 101027365 A | 8/2007 |
| CN | 101765791 A | 6/2010 |
| CN | 102132214 A | 7/2011 |
| CN | 102803174 A | 11/2012 |
| CN | 103502333 A | 1/2014 |
| CN | 103507322 A | 1/2014 |
| CN | 103874939 A | 6/2014 |
| CN | 104380150 A | 2/2015 |
| CN | 104619668 A | 5/2015 |
| DE | 19823732 A1 | 12/1999 |
| DE | 102014119261 A1 | 6/2015 |
| EP | 0927371 B1 | 7/1999 |
| JP | H0246366 A | 2/1990 |
| JP | H0312605 A | 1/1991 |
| JP | H05241017 A | 9/1993 |
| JP | H06016965 A | 1/1994 |
| JP | H06118229 A | 4/1994 |
| JP | H07258579 A | 10/1995 |
| JP | H8-259840 A | 10/1996 |
| JP | H10202813 A | 8/1998 |
| JP | H1112489 A | 1/1999 |
| JP | H11101913 A | 4/1999 |
| JP | H11504953 A | 5/1999 |
| JP | 2002080749 A | 3/2002 |
| JP | 2002090522 A | 3/2002 |
| JP | 2003053875 A | 2/2003 |
| JP | 2003329824 A | 11/2003 |
| JP | 2004505158 A | 2/2004 |
| JP | 2004134743 A | 4/2004 |
| JP | 2004510013 A | 4/2004 |
| JP | 2004512394 A | 4/2004 |
| JP | 2005513207 A | 5/2005 |
| JP | 3799696 B2 | 7/2006 |
| JP | 2006193738 A | 7/2006 |
| JP | 2006285196 A | 10/2006 |
| JP | 2007065232 A | 3/2007 |
| JP | 2007510022 A | 4/2007 |
| JP | 2007133325 A | 5/2007 |
| JP | 2007183525 A | 7/2007 |
| JP | 2008508404 A | 3/2008 |
| JP | 2008510866 A | 4/2008 |
| JP | 2008526002 A | 7/2008 |
| JP | 2008191592 A | 8/2008 |
| JP | 2008209520 A | 9/2008 |
| JP | 2008230218 A | 10/2008 |
| JP | 2008257777 A | 10/2008 |
| JP | 2009427633 A | 2/2009 |
| JP | 2009511725 A | 3/2009 |
| JP | 2010502433 A | 1/2010 |
| JP | 2010526015 A | 7/2010 |
| JP | 2010191431 A | 9/2010 |
| JP | 4948706 B2 | 6/2012 |
| JP | 2013518946 A | 5/2013 |
| JP | 2014237819 A | 12/2014 |
| JP | 2015120350 A | 7/2015 |
| JP | 2016027095 A | 2/2016 |
| JP | 2016049777 A | 4/2016 |
| WO | 9936258 A1 | 1/1999 |
| WO | 0012634 A1 | 3/2000 |
| WO | 2003062871 A1 | 7/2003 |
| WO | 2015153043 A1 | 10/2015 |

OTHER PUBLICATIONS

Office Action dated Jun. 4, 2019 pertaining to Japanese Patent Application No. 2014-117702.

Office Action dated Sep. 30, 2018 pertaining to Chinese Patent Application No. 201410693385.4.

Office Action dated Apr. 22, 2019 pertaining to Chinese Patent Application No. 201410693385.4.

Office Action dated Sep. 21, 2018 pertaining to German Patent Application No. 10 2014 119 261.3.

Office Action dated Feb. 5, 2019 pertaining to Japanese Patent Application No. 2016-559529.

Office Action dated Jul. 12, 2018 pertaining to Chinese Patent Application No. 201580026216.8.

(56) References Cited

OTHER PUBLICATIONS

Office Action dated Apr. 1, 2019 pertaining to Chinese Patent Application No. 201580026216.8.
Office Action dated Oct. 9, 2019 pertaining to Chinese Patent Application No. 201580026216.8.
International Preliminary Report on Patentability dated Oct. 4, 2016 pertaining to PCT/US2015/018640, filed Mar. 1, 2015.
International Search Report and Written Opinion dated May 29, 2015 pertaining to PCT/US2015/018640, filed Mar. 4, 2015.
Office Action dated Nov. 2, 2018 pertaining to Chinese Patent Application No. 201510498432.4.
Office Action dated Jun. 28, 2019 pertaining to Chinese Patent Application No. 201510498432.4.
Office Action dated Dec. 3, 2019 pertaining to Chinese Patent Application No. 201510498432.4.
Office Action dated May 28, 2019 pertaining to Japanese Patent Application No. 2015-160731.
Office Action dated Mar. 20, 2018 pertaining to Japanese Patent Application No. 2015-169044.
Office Action dated Feb. 8, 2018 pertaining to German Patent Application No. 102015113535.3.
Office Action dated Sep. 4, 2018 pertaining to Chinese Patent Application No. 201510624641.9.
Office Action dated Nov. 5, 2019 pertaining to Japanese Patent Application No. 2016-014076.
Office Action dated Jul. 16, 2019 pertaining to Chinese Patent Application No. 201610040211.7.
Office Action dated Oct. 29, 2018 pertaining to Chinese Patent Application No. 201610397388.2.
Office Action dated Jun. 4, 2019 pertaining to Chinese Patent Application No. 201610397388.2.
Office Action dated May 29, 2018 pertaining to Japanese Patent Application No. 2016-113282.
Office Action dated Apr. 16, 2019 pertaining to Japanese Patent Application No. 2016-113282.
Office Action dated Oct. 29, 2018 pertaining to Chinese Patent Application No. 201610397718.8.
Office Action dated Jun. 5, 2018 pertaining to Japanese Patent Application No. 2016-113434.
Office Action dated Oct. 25, 2018 pertaining to Chinese Patent Application No. 201610395759.3.
Office Action dated Jun. 4, 2019 pertaining to Chinese Patent Application No. 201610395759.3.
Office Action dated May 29, 2018 pertaining to Japanese Patent Application No. 2016-113285.
Office Action dated Apr. 16, 2019 pertaining to Japanese Patent Application No. 2016-113285.
Office Action dated Jul. 10, 2019 pertaining to Chinese Patent Application No. 201710284783.4.
Office Action dated Sep. 18, 2018 pertaining to Japanese Patent Application No. 2017-085886.
Office Action dated Jun. 4, 2019 pertaining to Japanese Patent Application No. 2017-085886.
Office Action dated Jan. 23, 2013 pertaining to Japanese Patent Application No. 2008-208255.
Office Action dated Feb. 26, 2014 pertaining to Japanese Patent Application No. 2008-208255.
Office Action dated Sep. 30, 2014 pertaining to Japanese Patent Application No. 2008-208255.
Office Action dated Jan. 30, 2017 pertaining to Japanese Patent Application No. 2010-114777.
Office Action dated Jan. 29, 2015 pertaining to Japanese Patent Application No. 2011-126545.
Office Action dated Jun. 23, 2015 pertaining to Japanese Patent Application No. 2011-126545.
Office Action dated Jan. 27, 2014 pertaining to Japanese Patent Application No. 2011-213056.
Office Action dated Nov. 20, 2014 pertaining to Japanese Patent Application No. 2011-213056.
Office Action dated Aug. 15, 2017 pertaining to Japanese Patent Application No. 2013-167895.
Office Action dated Feb. 20, 2018 pertaining to Japanese Patent Application No. 2013-167895.
English Translation of German office action for application 10 2016 110 192.3 dated Jan. 11, 2021 (12 pages).
English Translation of German office action for application 10 2016 110 314.4 dated Jan. 11, 2021 (13 pages).
English Translation of German office action for application 10 2016 110 095.1 dated Jan. 11, 2021 (13 pages).
German office action for application 10 2017 107 230.6 dated Feb. 2, 2021 (14 pages with English translation).
Japanese office action for application 2020-002230 dated Feb. 8, 2021 (5 pages with English translation).
German office action for application 11 2010 001 362.4 dated May 10, 2021 (12 pages with English translation).
Chinese office action for application 202010927458.7 dated Apr. 16, 2021 (27 pages with English translation).
Chinese office action for application 202010092655.1 dated Jun. 3, 2021 (107 pages with English translation).

\* cited by examiner

NON-COLOR SHIFTING MULTILAYER STRUCTURES

CROSS REFERENCE TO RELATED APPLICATIONS

The instant application is a continuation of U.S. patent application Ser. No. 14/242,429 filed on Apr. 1, 2014, which is incorporated herein in its entirety by reference.

FIELD OF THE INVENTION

The present invention is related to multilayer thin film structures, and in particular to multilayer thin film structures that exhibit a minimum or non-noticeable color shift when exposed to broadband electromagnetic radiation and viewed from different angles.

BACKGROUND OF THE INVENTION

Pigments made from multilayer structures are known. In addition, pigments that exhibit or provide a high-chroma omnidirectional structural color are also known. However, such prior art pigments have required as many as 39 thin film layers in order to obtain desired color properties.

It is appreciated that cost associated with the production of thin film multilayer pigments is proportional to the number of layers required. As such, the cost associated with the production of high-chroma omnidirectional structural colors using multilayer stacks of dielectric materials can be prohibitive. Therefore, a high-chroma omnidirectional structural color that requires a minimum number of thin film layers would be desirable.

SUMMARY OF THE INVENTION

An omnidirectional multilayer thin film is provided. The multilayer thin film includes a multilayer stack having a first layer of a first material and a second layer of a second material, the second layer extending across the first layer. The multilayer stack reflects a narrow band of electromagnetic radiation having a full width at half maximum (FWHM) of less than 300 nanometers (nm) and in some instances has a FWHM of less than 200 nm. The multilayer stack also has a color shift in the form of a center wavelength shift of less than 50 nm, preferably less than 40 nm and more preferably less than 30 nm, when the multilayer stack is exposed to broadband electromagnetic radiation and viewed from angles between 0 and 45 degrees. In the alternative, the color shift can be in the form of a hue shift of less than 30°, preferably less than 25° and more preferably less than 20°. In addition, the multilayer stack may or may not reflect a band of electromagnetic radiation in the ultraviolet (UV) range and/or reflect a band of electromagnetic radiation in the infrared (IR) range.

In some instances, the multilayer stack has a total thickness of less than 2 microns (µm). Preferably, the multilayer thin film has a total thickness of less than 1.5 µm and more preferably less than 1.0 µm.

The multilayer stack can be made from dielectric layers, i.e. the first layer and the second layer can be made from dielectric materials. In the alternative, the first layer can be a dielectric material and the second layer can be an absorbing material. The first layer has a thickness between 30-300 nm. The absorbing material can be a selective absorbing material, or in the alternative, a non-selective absorbing material. The selective absorbing material absorbs only a desired portion of the visible electromagnetic radiation spectrum and can be made from materials such as copper (Cu), gold (Au), zinc (Zn), tin (Sn), alloys thereof, and the like. In the alternative, the selective absorbing material can be made from a colorful dielectric material such as $Fe_2O_3$, $Cu_2O$, and combinations thereof. Such a second layer made from a selective absorbing material can have a thickness between 20-80 nm.

The non-selective absorbing material/layer generally absorbs all of the visible electromagnetic radiation spectrum and can be made from materials such as chromium (Cr), tantalum (Ta), tungsten (W), molybdenum (Mo), titanium (Ti), titanium nitride, niobium (Nb), cobalt (Co), silicon (Si), germanium (Ge), nickel (Ni), palladium (Pd), vanadium (V), ferric oxide, and combinations or alloys thereof. Such a non-selective absorbing layer has a thickness between 5-20 nm.

The multilayer stack can further include a reflector layer with the first and second layers extending across the reflector layer. The reflector layer can be made from a metal such as aluminum (Al), silver (Ag), Au, platinum (Pt), Cr, Cu, Zn, Sn, and alloys thereof. Also, the reflector has a thickness between 50-200 nm.

The reflected narrow band of electromagnetic radiation characteristic of the multilayer thin film can have a generally symmetrical peak. In the alternative, the reflected narrow band of electromagnetic radiation does not have a symmetrical peak. In some instances, the multilayer thin film provides a narrow band of reflected electromagnetic radiation in the visible range by taking advantage of the non-visible UV range and/or IR range. Stated differently, the multilayer thin film can reflect a generally broad band of electromagnetic radiation; however, only a narrow band is visible. In addition, the narrow band of visible electromagnetic radiation has a very low color shift, e.g. a center wavelength shift of less than 50 nm, when the multilayer thin film is viewed from angles between 0 and 45 degrees.

The multilayer thin film can also have a low hue shift when viewed from 0 and 45 degrees. For example, the multilayer thin film can have a hue shift of less than 30 degrees when the thin film is viewed between angles of 0 and 45 degrees. In the alternative, the multilayer thin film can have a hue shift of less than 25 degrees, preferably less than 20 degrees, when the thin film is viewed between angles of 0 and 45 degrees.

DETAILED DESCRIPTION OF THE INVENTION

Figure 1A:
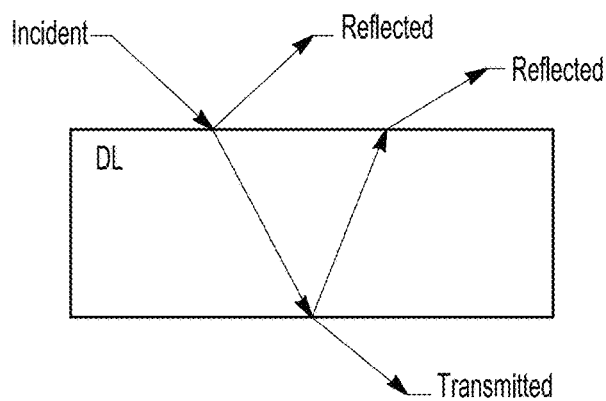
FIG. 1A is a schematic illustration of a dielectric layer (DL) reflecting and transmitting incident electromagnetic radiation.

An omnidirectional structural color is provided. The omnidirectional structural color has the form of a multilayer thin film (also referred to as a multilayer stack herein) that reflects a narrow band of electromagnetic radiation in the visible spectrum and has a small or non-noticeable color shift when the multilayer thin film is viewed from angles between 0 to 45 degrees. The multilayer thin film can be used as pigment in a paint composition, a continuous thin film on a structure and the like.

The multilayer thin film includes a multilayer stack that has a first layer and a second layer extending across the first layer. In some instances, the multilayer stack reflects a narrow band of electromagnetic radiation that has a FWHM of less than 300 nm, preferably less than 200 nm and in some instances less than 150 nm. The multilayer thin film also has a color shift of less than 50 nm, preferably less than 40 nm and more preferably less than 30 nm, when the multilayer stack is exposed to broadband electromagnetic radiation, e.g. white light, and viewed from angles between 0 and 45 degrees. Also, the multilayer stack may or may not have a separate reflected band of electromagnetic radiation in the UV range and/or the IR range.

The overall thickness of the multilayer stack is less than 2 preferably less than 1.5 and still more preferably less than 1.0 As such, the multilayer stack can be used as paint pigment in thin film paint coatings.

The first and second layers can be made from dielectric material, or in the alternative, the first and/or second layer can be made from an absorbing material. Absorbing materials include selective absorbing materials such as Cu, Au, Zn, Sn, alloys thereof, and the like, or in the alternative colorful dielectric materials such as $Fe_2O_3$, $Cu_2O$, combinations thereof, and the like. The absorbing material can also be a non-selective absorbing material such as Cr, Ta, W, Mo, Ti, Ti-nitride, Nb, Co, Si, Ge, Ni, Pd, V, ferric oxides, combinations or alloys thereof, and the like. The thickness of an absorbing layer made from selective absorbing material is between 20-80 nm whereas the thickness of an absorbing layer made from non-selective absorbing material is between 5-30 nm.

The multilayer stack can also include a reflector layer which the first layer and the second layer extend across, the reflector layer made from metals such as Al, Ag, Pt, Cr, Cu, Zn, Au, Sn, alloys thereof, and the like. The reflector layer typically has a thickness between 30-200 nm.

The multilayer stack can have a reflected narrow band of electromagnetic radiation that has the form of a symmetrical peak within the visible spectrum. In the alternative, the reflected narrow band of electromagnetic radiation in the visible spectrum can be adjacent to the UV range such that a portion of the reflected band of electromagnetic radiation, i.e. the UV portion, is not visible to the human eye. In the alternative, the reflected band of electromagnetic radiation can have a portion in the IR range such that the IR portion is likewise not visible to the human eye.

Whether the reflected band of electromagnetic radiation that is in the visible spectrum borders the UV range, the IR range, or has a symmetrical peak within the visible spectrum, multilayer thin films disclosed herein have a reflected narrow band of electromagnetic radiation in the visible spectrum that has a low, small or non-noticeable color shift. The low or non-noticeable color shift can be in the form of a small shift of a center wavelength for a reflected narrow band of electromagnetic radiation. In the alternative, the low or non-noticeable color shift can be in the form of a small shift of a UV-sided edge or IR-sided edge of a reflected band of electromagnetic radiation that borders the IR range or UV range, respectively. Such a small shift of a center wavelength, UV-sided edge and/or IR-sided edge is typically less than 50 nm, in some instances less than 40 nm, and in other instances less than 30 nm when the multilayer thin film is viewed from angles between 0 and 45 degrees.

Turning now to FIG. 1, FIGS. 1A-1D illustrate the basic components of an omnidirectional structural color design. In particular, FIG. 1A illustrates a dielectric layer exposed to incident electromagnetic radiation. In addition, the dielectric layer (DL) reflects a portion of the incident electromagnetic radiation and transmits a portion thereof. In addition, the incident electromagnetic radiation is equal to the transmitted portion and the reflected portion and typically the transmitted portion is much greater than the reflected portion. Dielectric layers are made from dielectric materials such as $SiO_2$, $TiO_2$, ZnS, $MgF_2$, and the like.

Figure 1B:
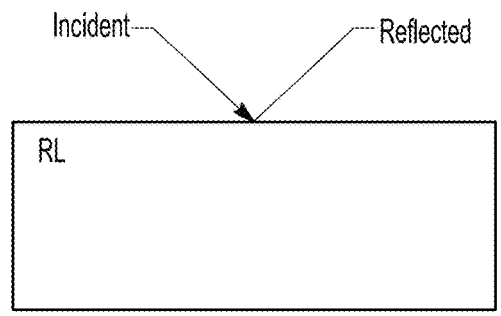
FIG. 1B is a schematic illustration of a reflector layer (RL) reflecting incident electromagnetic radiation.

In sharp contrast, FIG. 1B illustrates a reflective layer (RL) in which all of the incident electromagnetic radiation is reflected and essentially has zero transmittance. Reflector layers are typically made from materials such as aluminum, gold, and the like.

Figure 1C:
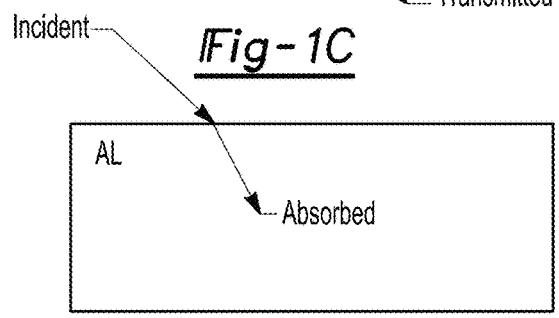
FIG. 1C is a schematic illustration of an absorbing layer (AL) absorbing incident electromagnetic radiation.

FIG. 1C illustrates an absorbing layer (AL) in which incident electromagnetic radiation is absorbed by the layer and not reflected or transmitted. Such an absorbing layer can be made from, for example, graphite. Also, the total incident electromagnetic radiation is absorbed and transmission and reflectance is approximately zero.

Figure 1D:
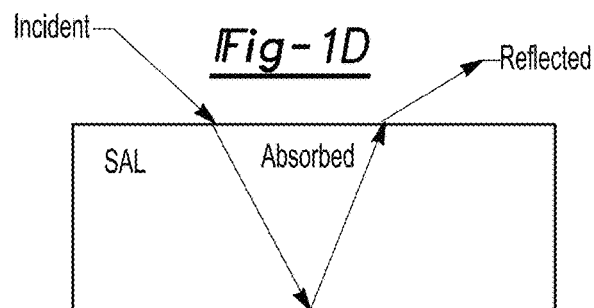
FIG. 1D is a schematic illustration of a selective absorbing layer (SAL) reflecting, absorbing and transmitting incident electromagnetic radiation.

FIG. 1D illustrates a partial or selective absorbing layer (SAL) in which a portion of the incident electromagnetic radiation is absorbed by the layer, a portion is transmitted, and a portion is reflected. As such, the amount of electromagnetic radiation transmitted, absorbed, and reflected equals the amount of incident electromagnetic radiation. In addition, such selective absorbing layers can be made from material such as a thin layer of chromium, layers of copper, brass, bronze, and the like.

With respect to the present invention, three generations of design and manufacture of omnidirectional structural color thin films are disclosed.

First Generation

Figure 2:
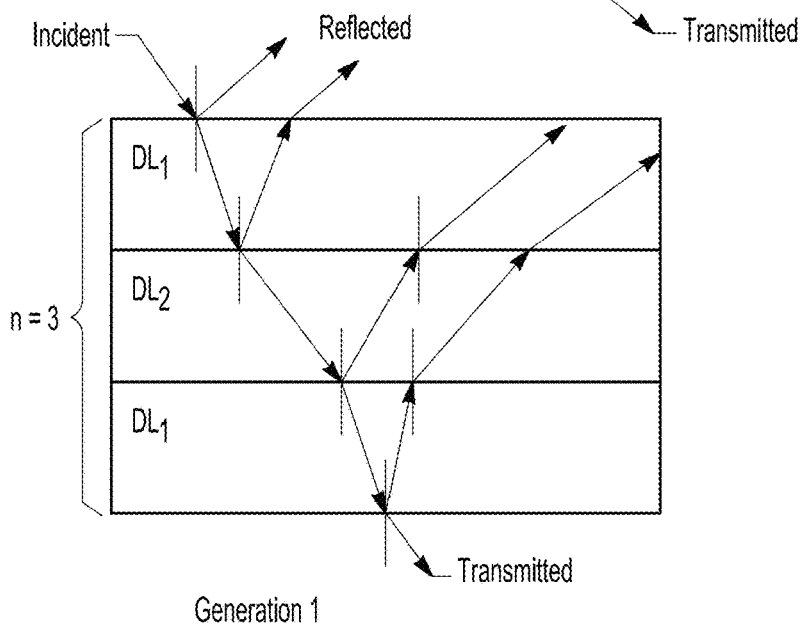
FIG. 2 is a schematic illustration of reflectance and transmission of incident electromagnetic radiation by a $1^{st}$ generation omnidirectional structural color multilayer thin film made from a plurality of dielectric layers.

Referring now to FIG. 2, a schematic illustration of a multilayer thin film having a plurality of dielectric layers is shown. In addition, the reflectance and transmittance of an incident electromagnetic radiation is schematically shown. As stated above, typically transmission of the incident electromagnetic radiation is much greater than reflectance thereof and thus many layers are required.

Figure 3:
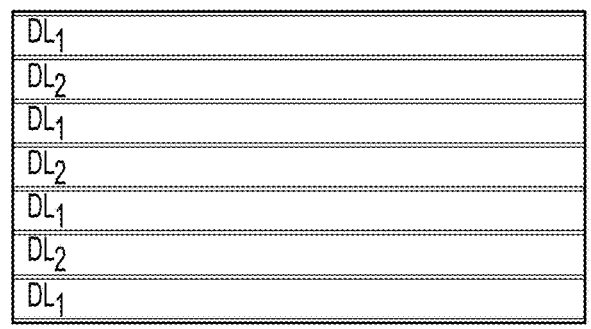
FIG. 3 is a schematic illustration of a $1^{st}$ generation omnidirectional structural color multilayer thin film made from a plurality of dielectric layers.

FIG. 3 shows part of a multilayer thin film made from dielectric layers having a first index of refraction ($DL_1$) and a second index of refraction ($DL_2$). It should be appreciated that the double lines between the layers simply represent an interface between the different layers.

Not being bound by theory, one method or approach for designing and manufacturing a desired multilayer stack is the following.

When electromagnetic radiation impacts a material surface, waves of the radiation can be reflected from or transmitted through the material. Furthermore, when electromagnetic radiation impacts the first end 12 of the multilayer structure 10 at the angle $\theta_0$, the reflected angles the electromagnetic waves make with the surface of the high and low refractive index layers are $\theta_H$ and $\theta_L$, respectively. Using Snell's law:

$$n_0 \sin \theta_0 = n_L \sin \theta_L = n_H \sin \theta_H \quad (1)$$

the angles $\theta_H$ and $\theta_L$ can be determined if the refractive indices $n_H$ and $n_L$ are known.

Regarding omnidirectional reflectivity, a necessary but not sufficient condition for the TE mode and the TM mode of electromagnetic radiation requires the maximum angle of refraction ($\theta_{H,MAX}$) inside the first layer to be less than the Brewster angle ($\theta_B$) of the interface between the first layer and the second layer. If this condition is not satisfied, the TM mode of the electromagnetic waves will not be reflected at the second and all subsequent interfaces and thus will transmit through the structure. Using this consideration:

$$\sin\theta_{H,Max} = \frac{n_0}{n_H} \quad (2)$$

and $$\tan\theta_B = \frac{n_L}{n_H} \quad (3)$$

Thereby requiring:

$$n_0 < \frac{n_H n_L}{\sqrt{n_H^2 + n_L^2}} \quad (4)$$

In addition to the necessary condition represented by Equation 4, if electromagnetic radiation of wavelength $\lambda$ falls on a multilayer structure with an angle $\theta_0$, and the individual bi-layers of the multilayer structure have thicknesses $d_H$ and $d_L$ with respective refractive indices $n_H$ and $n_L$, the characteristic translation matrix ($F_T$) can be expressed as:

$$F_T = \frac{1}{1+\rho_T}\begin{vmatrix} e^{i\delta_L} & \rho_T e^{-i\delta_L} \\ \rho_T e^{i\delta_L} & e^{-i\delta_L} \end{vmatrix} \times \frac{1}{1-\rho_T}\begin{vmatrix} e^{i\delta_H} & \rho_T e^{-i\delta_H} \\ \rho_T e^{i\delta_H} & e^{-i\delta_H} \end{vmatrix} \quad (5)$$

which can also be expressed as:

$$F_T = \frac{1}{1-\rho_T^2}\begin{vmatrix} e^{i(\delta_L+\delta_H)} - \rho_T^2 e^{-i(\delta_H-\delta_L)} & -2i\rho_T e^{-i\delta_H}\sin\delta_L \\ 2i\rho_T e^{i\delta_H}\sin\delta_L & e^{-i(\delta_L+\delta_H)} - \rho_T^2 e^{-i(\delta_H-\delta_L)} \end{vmatrix} \quad (6)$$

and where:

$$\delta_H = \frac{2\pi}{\lambda} n_H d_H \cos\theta_H \quad (7)$$

$$\delta_L = \frac{2\pi}{\lambda} n_L d_L \cos\theta_L \quad (8)$$

$$\cos\theta_H = \sqrt{1 - \frac{n_o^2 \sin^2\theta_0}{n_H^2}} \quad (9)$$

and $$\cos\theta_L = \sqrt{1 - \frac{n_o^2 \sin^2\theta_0}{n_L^2}} \quad (10)$$

In addition, $$\rho_T = \frac{n_{HT} - n_{LT}}{n_{HT} + n_{LT}} \quad (11)$$

where $$n_{HT} = \begin{cases} \dfrac{n_H}{\cos\theta_H} \\ n_H \cos\theta_H \end{cases} \text{(for TM and TE polarization respectively)} \quad (12)$$

and $$n_{LT} = \begin{cases} \dfrac{n_L}{\cos\theta_L} \\ n_L \cos\theta_L \end{cases} \text{(for TM and TE polarization respectively)} \quad (13)$$

Solving $\rho_T$ explicitly for TE and TM:

$$\rho_{TM} = \frac{n_H \cos\theta_L - n_L \cos\theta_H}{n_H \cos\theta_L + n_L \cos\theta_H} \quad (14)$$

and $$\rho_{TE} = \frac{n_H \cos\theta_H - n_L \cos\theta_L}{n_H \cos\theta_H + n_L \cos\theta_L} \quad (15)$$

A viewing angle dependant band structure can be obtained from a boundary condition for the edge, also known as the bandedge, of the total reflection zone. For the purposes of the present invention, bandedge is defined as the equation for the line that separates the total reflection zone from the transmission zone for the given band structure.

A boundary condition that determines the bandedge frequencies of the high reflectance band can be given by:

$$\text{Trace}|F_T| = -1 \quad (16)$$

Thus, from equation 3:

$$\frac{\cos(\delta_H + \delta_L) - \rho_T^2 \cos(\delta_H - \delta_L)}{1 - \rho_T^2} = -1 \quad (17)$$

or expressed differently:

$$\cos^2\left(\frac{\delta_H + \delta_L}{2}\right) = \rho_T^2 \cos^2\left(\frac{\delta_H - \delta_L}{2}\right) \quad (18)$$

Combining equations 15 and 7, the following bandedge equation is obtained:

$$\cos\left(\frac{\pi L_+}{\lambda}\right) = \pm|\rho_T|\cos\left(\frac{\pi L_-}{\lambda}\right) \quad (19)$$

Where:

$$L_+ = n_H d_H \cos\theta_H + n_L d_L \cos\theta_L \quad (20)$$

and:

$$L_- = n_H d_H \cos\theta_H - n_L d_L \cos\theta_L \quad (21)$$

The + sign in the bandedge equation shown above represents the bandedge for the long wavelength ($\Delta_{long}$) and the − sign represents the bandedge for the short wavelength ($\Delta_{short}$). Recompiling equations 20 and 21:

$$\cos\left(\frac{\pi L_+}{\lambda_{long}}\right) = +|\rho_{TE}|\cos\left(\frac{\pi L_-}{\lambda_{long}}\right) \text{ and} \quad (22)$$

$$\cos\left(\frac{\pi L_+}{\lambda_{Short}}\right) = -|\rho_{TE}|\cos\left(\frac{\pi L_-}{\lambda_{Short}}\right)$$

for the TE mode, and:

$$\cos\left(\frac{\pi L_+}{\lambda_{long}}\right) = +|\rho_{TM}|\cos\left(\frac{\pi L_-}{\lambda_{long}}\right) \text{ and} \quad (23)$$

$$\cos\left(\frac{\pi L_+}{\lambda_{Short}}\right) = -|\rho_{TM}|\cos\left(\frac{\pi L_-}{\lambda_{Short}}\right)$$

for the TM mode.

An approximate solution of the bandedge can be determined by the following expression:

$$L_- = n_H d_H \cos\theta_H - n_L d_L \cos\theta_L \sim 0 \quad (24)$$

This approximate solution is reasonable when considering a quarter wave design (described in greater detail below) and optical thicknesses of the alternating layers chosen to be equal to each other. In addition, relatively small differences in optical thicknesses of the alternating layers provide a cosine close to unity. Thus, equations 23 and 24 yield approximate bandedge equations:

$$\lambda_{long}(\theta_0) = \frac{\pi L_+(\theta_0)}{\cos^{-1}|\rho_{TE}(\theta_0)|} \text{ and} \quad (25)$$

$$\lambda_{short}(\theta_0) = \frac{\pi L_+(\theta_0)}{\cos^{-1}(-|\rho_{TE}(\theta_0)|)}$$

for the TE mode and:

$$\lambda_{long}(\theta_0) = \frac{\pi L_+(\theta_0)}{\cos^{-1}|\rho_{TM}(\theta_0)|} \text{ and} \quad (26)$$

$$\lambda_{short}(\theta_0) = \frac{\pi L_+(\theta_0)}{\cos^{-1}(-|\rho_{TM}(\theta_0)|)}$$

for the TM mode.

Values for $L_+$ and $\rho_{TM}$ as a function of incident angle can be obtained from equations 7, 8, 14, 15, 20 and 21, thereby allowing calculations for $\lambda_{long}$ and $\lambda_{short}$ in the TE and TM modes as a function of incident angle.

The center wavelength of an omnidirectional reflector ($\lambda_c$), can be determined from the relation:

$$\lambda_c = 2(n_H d_H \cos\theta_H + n_L d_L \cos\theta_L) \quad (30)$$

The center wavelength can be an important parameter since its value indicates the approximate range of electromagnetic wavelength and/or color spectrum to be reflected. Another important parameter that can provide an indication as to the width of a reflection band is defined as the ratio of range of wavelengths within the omnidirectional reflection band to the mid-range of wavelengths within the omnidirectional reflection band. This "range to mid-range ratio" ($\eta$) is mathematically expressed as:

$$\eta_{TE} = 2\frac{\lambda_{long}^{TE}(\theta_0 = 90°) - \lambda_{short}^{TE}(\theta_0 = 0°)}{\lambda_{long}^{TE}(\theta_0 = 90°) + \lambda_{short}^{TE}(\theta_0 = 0°)} \quad (31)$$

for the TE mode, and:

$$\eta_{TM} = 2\frac{\lambda_{long}^{TM}(\theta_0 = 90°) - \lambda_{short}^{TM}(\theta_0 = 0°)}{\lambda_{long}^{TM}(\theta_0 = 90°) + \lambda_{short}^{TM}(\theta_0 = 0°)} \quad (32)$$

for the TM mode. It is appreciated that the range to mid-range ratio can be expressed as a percentage and for the purposes of the present invention, the term range to mid-range ratio and range to mid-range ratio percentage are used interchangeably. It is further appreciated that a 'range to mid-range ratio' value provided herein having a '%' sign following is a percentage value of the range to mid-range ratio. The range to mid-range ratios for the TM mode and TE mode can be numerically calculated from equations 31 and 32 and plotted as a function of high refractive index and low refractive index.

It is appreciated that to obtain the narrow omnidirectional band that the dispersion of the center wavelength must be minimized. Thus, from equation 30, the dispersion of the center wavelength can be expressed as:

$$\Delta\lambda_c = \lambda_c|_{\theta_0=0°} - \lambda_c|_{\theta_0=90°} = \quad (34)$$

$$2\left(\frac{n_H d_H}{1} + \frac{n_L d_L}{1} - \frac{n_H d_H}{\sqrt{1-\frac{n_0^2}{n_H^2}}} - \frac{n_L d_L}{\sqrt{1-\frac{n_0^2}{n_L^2}}}\right) \text{ where:}$$

$$\Delta\lambda_c = \frac{\lambda_0}{4}F_c \quad (35)$$

and $F_c$, the center wavelength dispersion factor can be expressed as:

$$F_c = \left(2 - \frac{1}{\sqrt{1-\frac{n_0^2}{n_H^2}}} - \frac{1}{\sqrt{1-\frac{n_0^2}{n_L^2}}}\right) \quad (36)$$

Given the above, a multilayer stack with a desired low center wavelength shift ($\Delta\lambda_c$) can be designed from a low index of refraction material having an index of refraction of $n_L$ and one or more layers having a thickness of $d_L$ and a high index of refraction material having an index of refraction of $n_H$ and one or more layers having a thickness of $d_H$.

Figure 4:
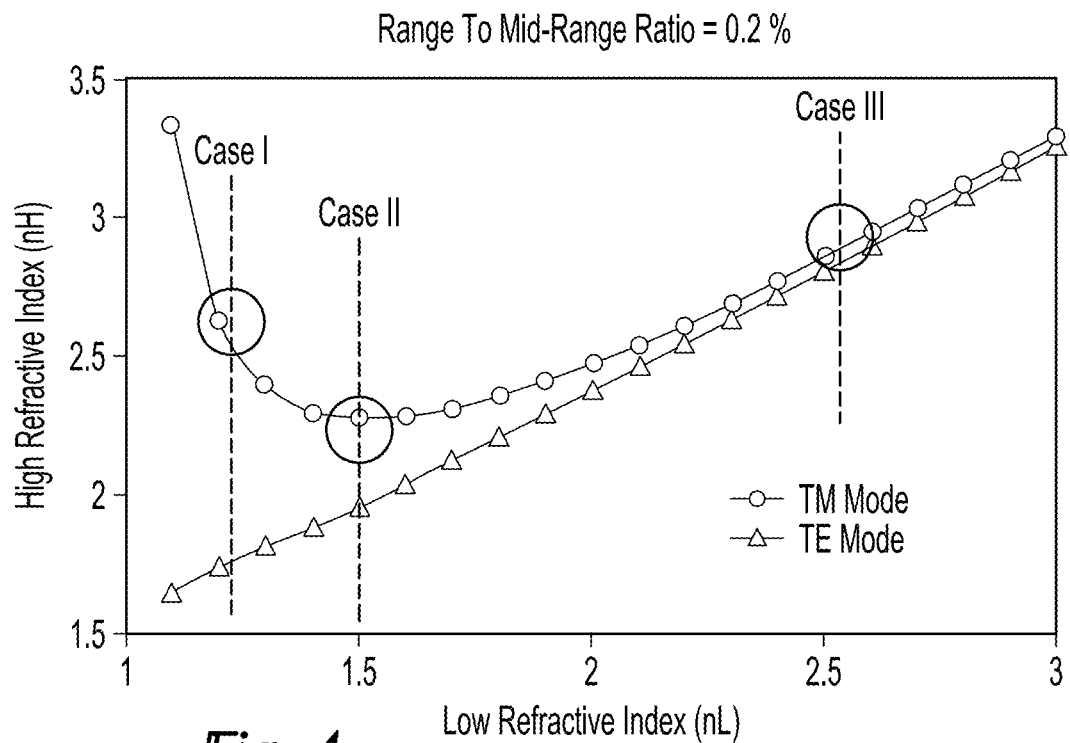
FIG. 4 is a graphical representation showing a comparison of the range to mid-range ratio of 0.2% for the transverse magnetic mode and transverse electric mode of electromagnetic radiation.

In particular, FIG. 4 provides a graphical representation of a comparison of the range to midrange ratio of 0.2% for the transverse magnetic mode and transverse electric mode of electromagnetic radiation plotted as a function of high refractive index versus low refractive index. As shown in the figure, three cases are illustrated in which Case I refers to a large difference between the transverse magnetic mode and the transverse electric mode, Case II refers to a situation for a smaller difference between the transverse magnetic mode and transverse electric mode, and Case III refers to a situation for a very small difference between the transverse magnetic mode and transverse electric mode. In addition, FIG. 5 illustrates a percent reflectance versus wavelength for reflected electromagnetic radiation for a case analogous with Case III.

Figure 5:
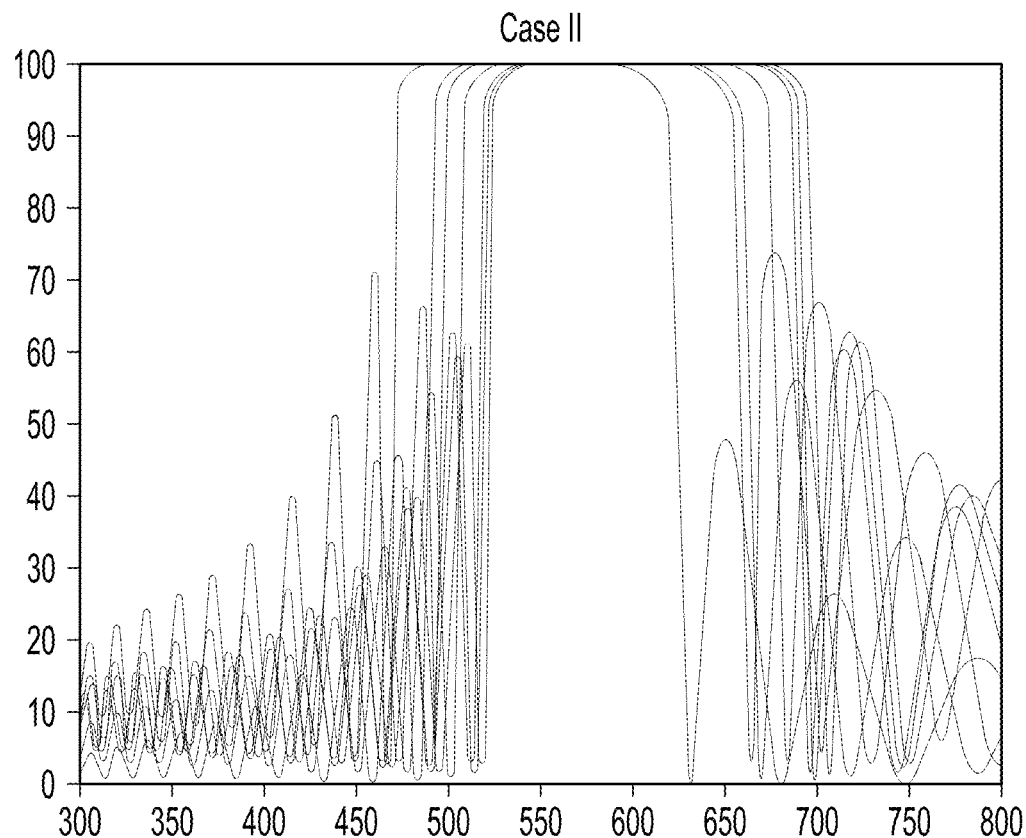
FIG. 5 is a graphical representation of reflectance as a function of wavelength for Case III shown in FIG. 4.
Figure 6:
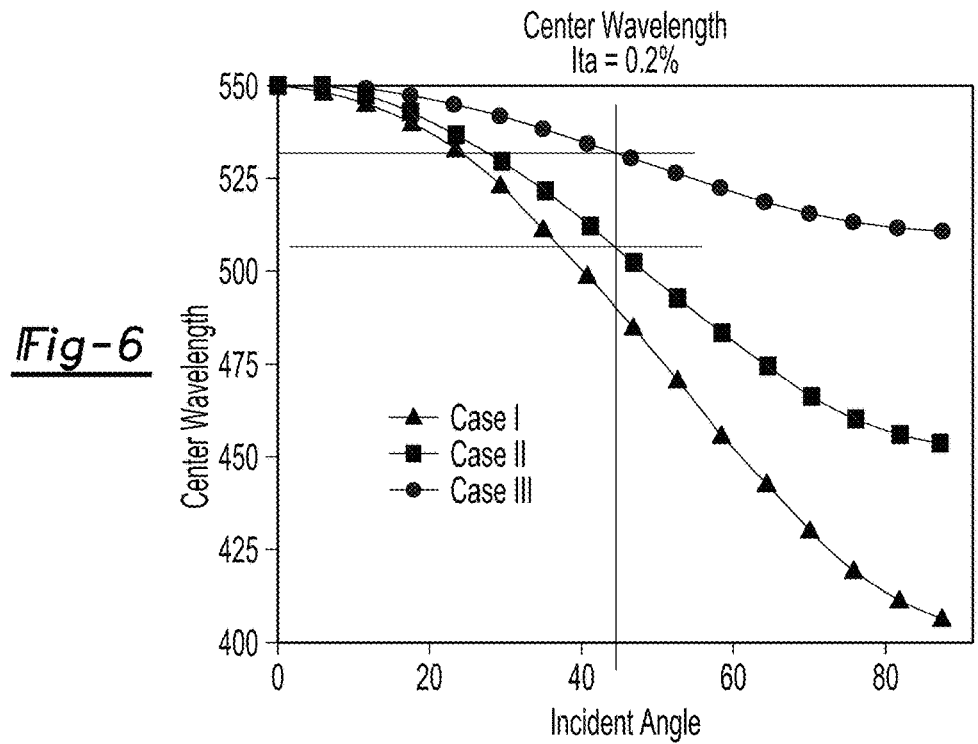
FIG. 6 is a graphical representation of the dispersion of the center wavelength in Case I, II and III shown in FIG. 4.

As shown in FIG. 5, a small dispersion of the center wavelength for a multilayer thin film corresponding to Case III is shown. In addition, and with reference to FIG. 6, Case II provides a shift in the center wavelength of less than 50 nm (Case II) when a multilayer thin film structure is viewed between 0 and 45 degrees and Case III provides a center wavelength shift of less than 25 nm when the thin film structure is exposed to electromagnetic radiation between 0 and 45 degrees.

Second Generation

Figure 7:
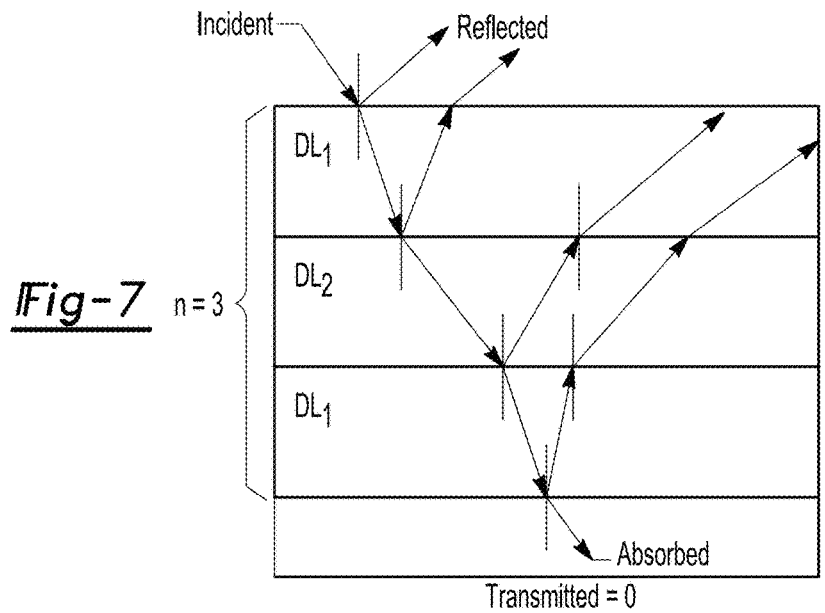
FIG. 7 is a schematic illustration of reflectance and absorption of incident electromagnetic radiation by a $2^{nd}$ generation omnidirectional structural color multilayer thin film made from a plurality of dielectric layers and an absorbing layer.

Referring now to FIG. 7, an illustrative structure/design according to a second generation is shown. The multilayer structure shown in FIG. 7 has a plurality of dielectric layers and an underlying absorbing layer. In addition, none of the incident electromagnetic radiation is transmitted through the structure, i.e. all of the incident electromagnetic radiation is reflected or absorbed. Such a structure as shown in FIG. 7 allows for the reduction of the number of dielectric layers that are needed in order to obtain a suitable amount of reflectance.

Figure 8:
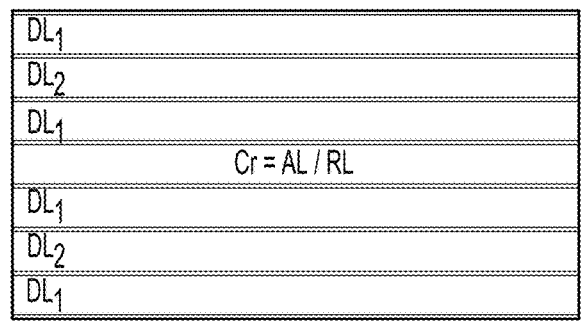
FIG. 8 is a schematic illustration of a $2^{nd}$ generation omnidirectional structural color multilayer thin film made from a plurality of dielectric layers and an absorbing layer and/or reflecting layer.

For example, FIG. 8 provides a schematic illustration of such a structure in which a multilayer stack has a central absorbing layer made from Cr, a first dielectric material layer ($DL_1$) extending across the Cr absorbing layer, a second dielectric material layer ($DL_2$) extending across the $DL_1$ layer, and then another $DL_1$ layer extending across the $DL_2$ layer. In such a design, the thicknesses of the first dielectric layer and the third dielectric layer may or may not be the same.

Figure 9A:
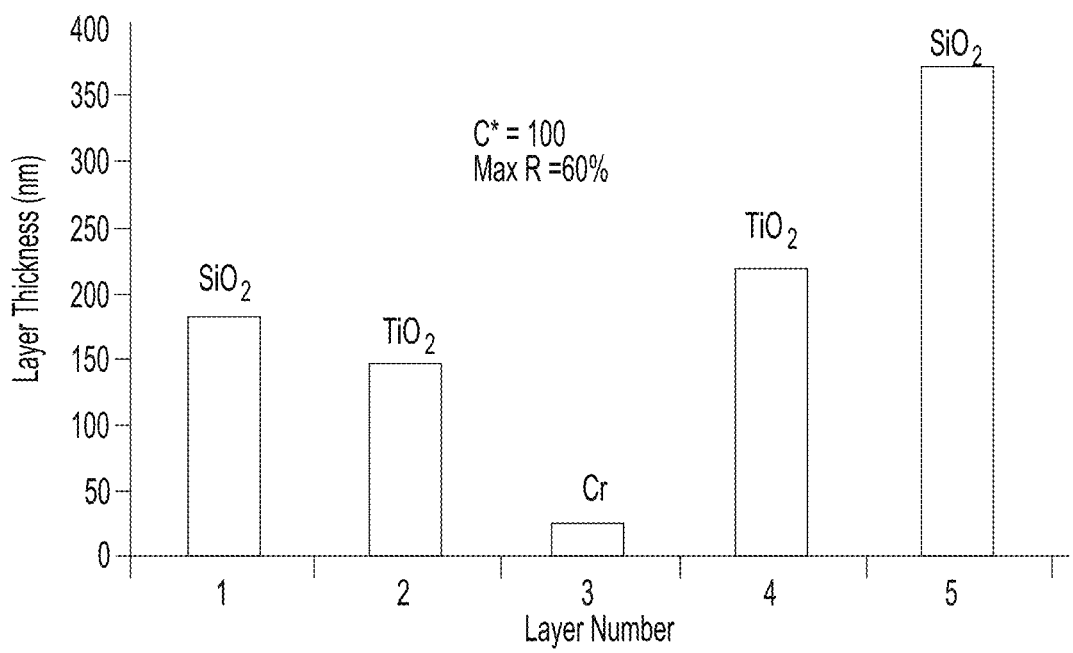
FIG. 9A is schematic illustration of a $2^{nd}$ generation 5-layer omnidirectional structural color multilayer thin film made from a plurality of dielectric layers and an absorbing/reflecting layer having a chroma (C*) of 100 and a reflectance (Max R) of 60%.
Figure 9B:
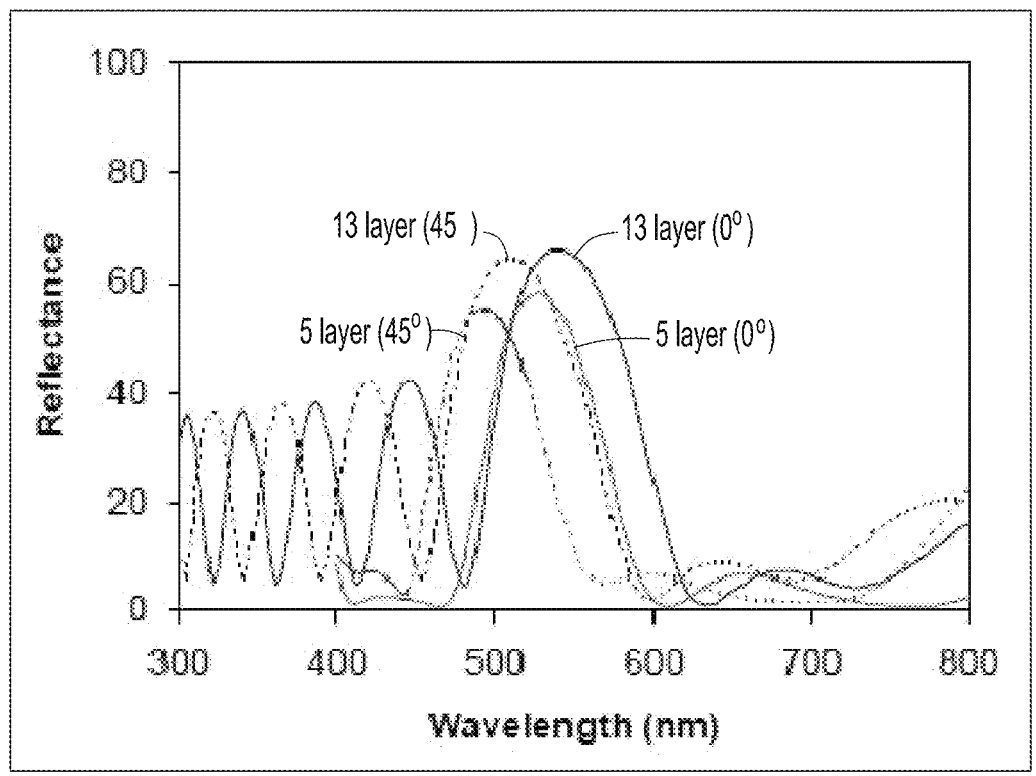
FIG. 9B is a graphical representation of reflectance versus wavelength for the $2^{nd}$ generation 5-layer multilayer stack thin film shown in FIG. 9A compared to a $1^{st}$ generation 13-layer multilayer thin film and for viewing angles of 0 and 45 degrees.

In particular, FIG. 9A shows a graphical representation of a structure in which a central Cr layer is bounded by two $TiO_2$ layers, which in turn are bounded by two $SiO_2$ layers. As shown by the plot, the layers of $TiO_2$ and $SiO_2$ are not equal in thickness to each other. In addition, FIG. 9B shows a reflectance versus wavelength spectrum of the 5-layer structure shown in FIG. 9A and compared to a 13-layer structure made according to the first generation design. As illustrated in FIG. 9B, a shift in the center wavelength of less than 50 nm, and preferably less than 25 nm is provided when the structures are viewed a 0 and 45 degrees. Also shown in FIG. 9B is the fact that a 5-layer structure according to the second generation essentially performs equivalent to a 13-layer structure of the first generation.

Third Generation

Figure 10:
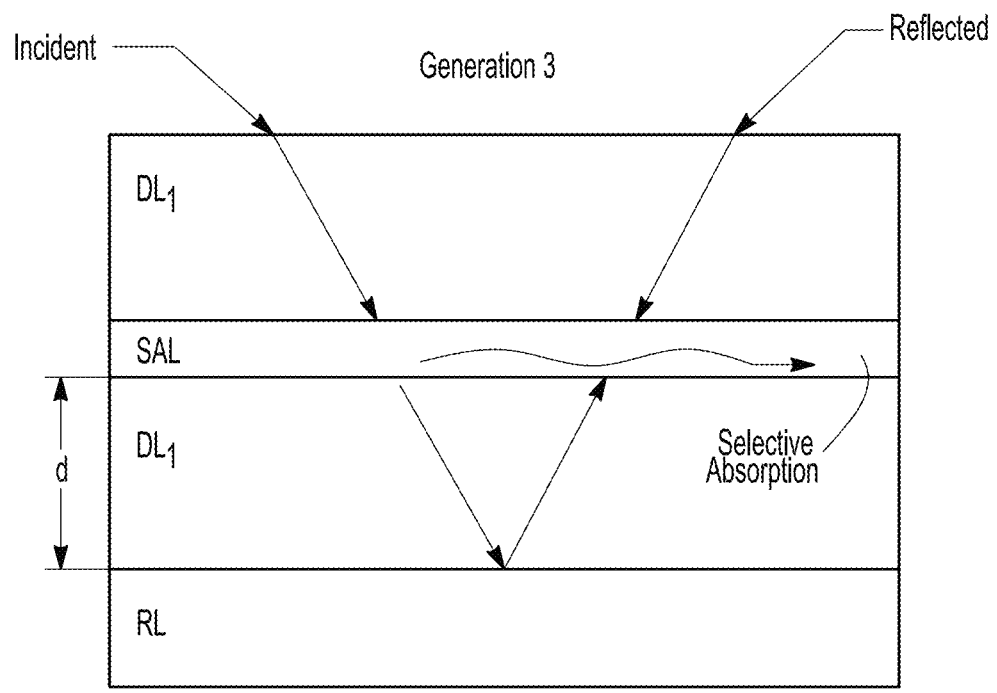
FIG. 10 is a schematic illustration of a $3^{rd}$ generation omnidirectional structural color multilayer thin film made from a dielectric layer, a selective absorbing layer (SAL) and a reflector layer.

Referring to FIG. 10, a third generation design is shown in which an underlying reflector layer (RL) has a first dielectric material layer $DL_1$ extending thereacross and a selective absorbing layer SAL extending across the $DL_1$ layer. In addition, another $DL_1$ layer may or may not be provided and extend across the selective absorbing layer. Also shown in the figure is an illustration that all of the incident electromagnetic radiation is either reflected or selectively absorbed by the multilayer structure.

Such a design as illustrated in FIG. 10 corresponds to a different approach that is used for designing and manufacturing a desired multilayer stack. In particular, a zero or near-zero energy point thickness for a dielectric layer is used and discussed below.

Figure 11A:
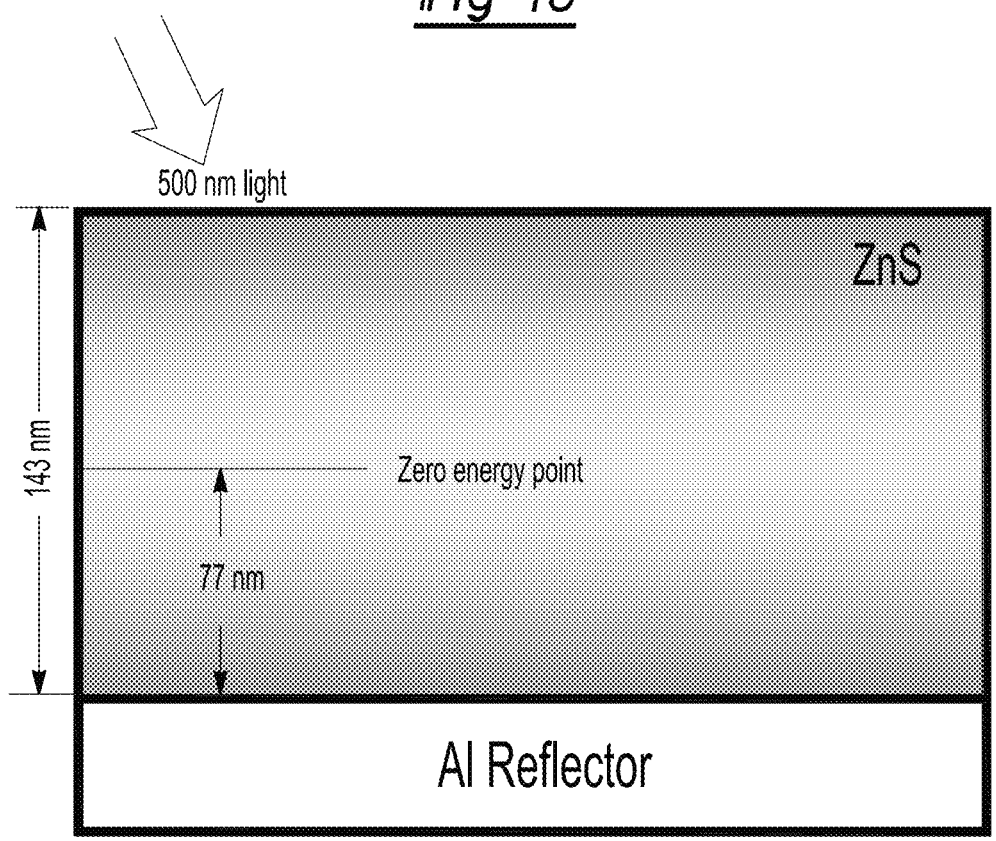
FIG. 11A is a schematic illustration of a zero or near-zero electric field point within a ZnS dielectric layer exposed to electromagnetic radiation (EMR) having a wavelength of 500 nm.
Figure 11B:
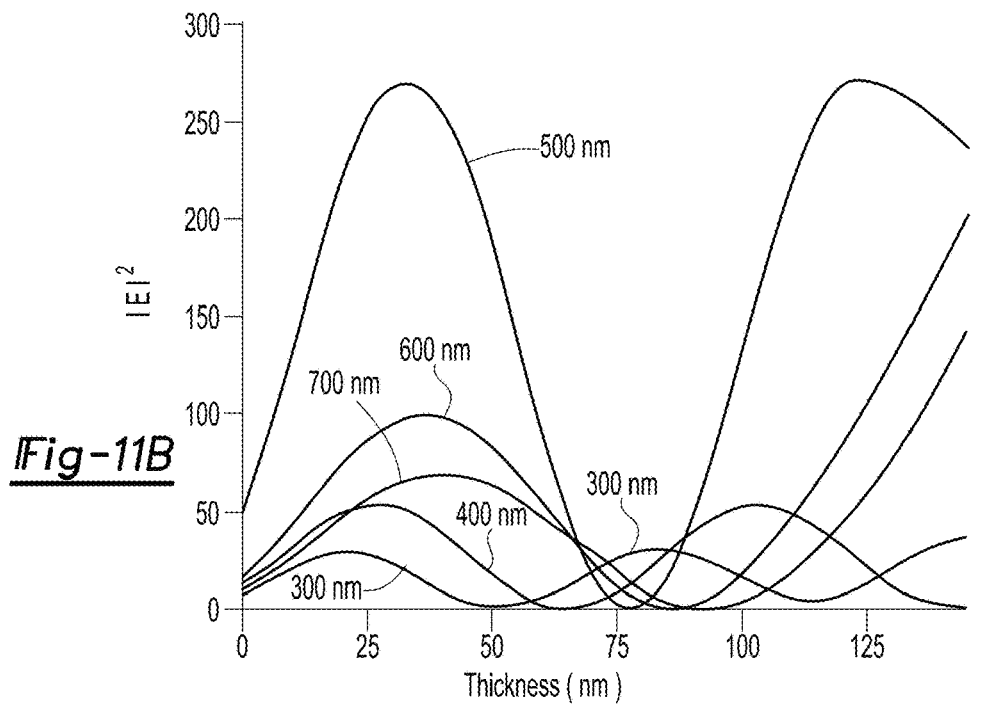
FIG. 11B is a graphical illustration of the absolute value of electric field squared ($|E|^2$) versus thickness of the ZnS dielectric layer shown in FIG. 1A when exposed to EMR having wavelengths of 300, 400, 500, 600 and 700 nm.

For example, FIG. 11A is a schematic illustration of a ZnS dielectric layer extending across an Al reflector layer. The ZnS dielectric layer has a total thickness of 143 nm, and for incident electromagnetic radiation with a wavelength of 500 nm, a zero or near-zero energy point is present at 77 nm. Stated differently, the ZnS dielectric layer exhibits a zero or near-zero electric field at a distance of 77 nm from the Al reflector layer for incident EMR having a wavelength of 500 nm. In addition, FIG. 11B provides a graphical illustration of the energy field across the ZnS dielectric layer for a number of different incident EMR wavelengths. As shown in the graph, the dielectric layer has a zero electric field for the 500 nm wavelength at 77 nm thickness, but a non-zero electric field at the 77 nm thickness for EMR wavelengths of 300, 400, 600 and 700 nm.

Figure 12:
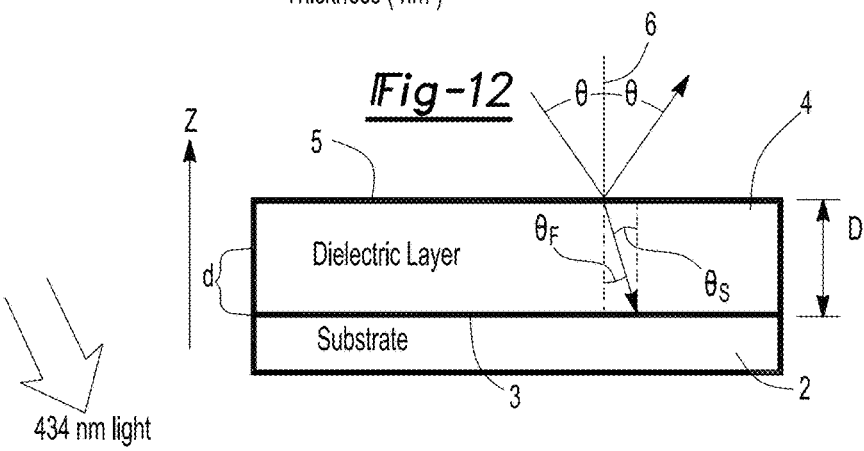
FIG. 12 is a schematic illustration of a dielectric layer extending over a substrate or reflector layer and exposed to electromagnetic radiation at an angle θ relative to a normal direction to the outer surface of the dielectric layer.

Regarding calculation of a zero or near-zero electric field point, FIG. 12 illustrates a dielectric layer 4 having a total thickness 'D', an incremental thickness 'd' and an index of refraction 'n' on a substrate or core layer 2 having a index of refraction $n_s$ is shown. Incident light strikes the outer surface 5 of the dielectric layer 4 at angle $\theta$ relative to line 6, which is perpendicular to the outer surface 5, and reflects from the outer surface 5 at the same angle. Incident light is transmitted through the outer surface 5 and into the dielectric layer 4 at an angle $\theta_F$ relative to the line 6 and strikes the surface 3 of substrate layer 2 at an angle $\theta_s$.

For a single dielectric layer, $\theta_s = \theta_F$ and the energy/electric field (E) can be expressed as E(z) when z=d. From Maxwell's equations, the electric field can be expressed for s polarization as:

$$\vec{E}(d) = \{u(z), 0, 0\} \exp(ik\alpha y)|_{z=d} \quad (37)$$

and for p polarization as:

$$\vec{E}(d) = \left\{0, u(z), -\frac{\alpha}{\varepsilon(z)} v(z)\right\} \exp(ik\alpha y)\Big|_{z=d} \quad (38)$$

where $$k = \frac{2\pi}{\lambda}$$

$\lambda$ is a desired wavelength to be reflected. Also, $\alpha = n_s \sin \theta_s$ where 's' corresponds to the substrate in FIG. 5 and $\vec{\varepsilon}(z)$ is the permittivity of the layer as a function of z. As such, $$|E(d)|^2 = |u(z)|^2 \exp(2ik\alpha y)|_{z=d} \quad (39)$$

for s polarization and $$|E(d)|^2 = \left[|u(z)|^2 + \left|\frac{\alpha}{\sqrt{n}} v(z)\right|^2\right] \exp(2ik\alpha y)\Big|_{z=d} \quad (40)$$

for p polarization.

It is appreciated that variation of the electric field along the Z direction of the dielectric layer 4 can be estimated by calculation of the unknown parameters u(z) and v(z) where it can be shown that:

$$\begin{pmatrix} u \\ v \end{pmatrix}_{z=d} = \begin{pmatrix} \cos\varphi & (i/q)\sin\varphi \\ iq\sin\varphi & \cos\varphi \end{pmatrix} \begin{pmatrix} u \\ v \end{pmatrix}_{z=0, substrate} \quad (41)$$

Naturally, 'i' is the square root of $-1$. Using the boundary conditions $u|_{z=0} = 1, v|_{z=0} = q$, and the following relations:

$q_s = n_s \cos \theta_s$ for s-polarization (42)

$q_s = n_s/\cos \theta_s$ for p-polarization (43)

$q = n \cos \theta_F$ for s-polarization (44)

$q = n/\cos \theta_F$ for p-polarization (45)

$\alpha = k \cdot n \cdot d \cos(\theta_F)$ (46)

u(z) and v(z) can be expressed as:

$$u(z)|_{z=d} = u|_{z=0} \cos\varphi + v|_{z=0} \left(\frac{i}{q}\sin\varphi\right) \quad (47)$$
$$= \cos\varphi + \frac{i \cdot q_s}{q} \sin\varphi$$

and

-continued $$v(z)|_{z=d} = iqu|_{z=0}\sin\varphi + v|_{z=0}\cos\varphi \quad (48)$$
$$= iq\sin\varphi + q_s\cos\varphi$$

Therefore:

$$|E(d)|^2 = \left[\cos^2\varphi + \frac{q_s^2}{q^2}\sin^2\varphi\right]e^{2ik\alpha\gamma} \quad (49)$$
$$= \left[\cos^2\varphi + \frac{n_s^2}{n^2}\sin^2\varphi\right]e^{2ik\alpha\gamma}$$

for s polarization with $\varphi = k \cdot n \cdot d \cos(\theta_F)$, and:

$$|E(d)|^2 = \left[\cos^2\varphi + \frac{n_s^2}{n^2}\sin^2\varphi + \frac{\alpha^2}{n}(q_s^2\cos^2\varphi + q^2\sin^2\varphi)\right] \quad (50)$$
$$= \left[\left(1 + \frac{\alpha^2 q_s^2}{n}\right)\cos^2\varphi + \left(\frac{n_s^2}{n^2} + \frac{\alpha^2 q^2}{n}\right)\sin^2\varphi\right]$$

for p polarization where:

$$\alpha = n_s\sin\theta_s = n\sin\theta_F \quad (51)$$

$$q_s = \frac{n_s}{\cos\theta_s} \quad (52)$$

and $$q_s = \frac{n}{\cos\theta_F} \quad (53)$$

Thus for a simple situation where $\theta_F = 0$ or normal incidence, $\varphi = k \cdot n \cdot d$, and $\alpha = 0$:

$$|E(d)|^2 \text{ for s-polarization} = |E(d)|^2 \text{ for p-polarization} \quad (54)$$
$$= \left[\cos^2\varphi + \frac{n_s^2}{n^2}\sin^2\varphi\right]$$
$$= \left[\cos^2(k \cdot n \cdot d) + \frac{n_s^2}{n^2}\sin^2(k \cdot n \cdot d)\right] \quad (55)$$

which allows for the thickness 'd' to be solved for, i.e. the position or location within the dielectric layer where the electric field is zero.

Figure 13:
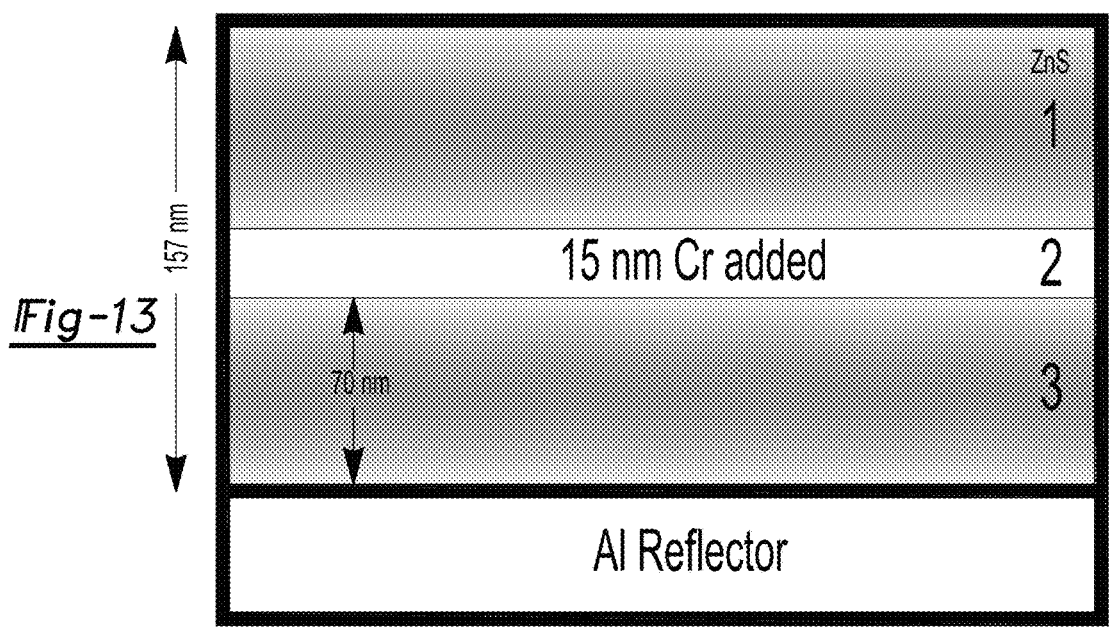
FIG. 13 is a schematic illustration of a ZnS dielectric layer with a Cr absorber layer located at the zero or near-zero electric field point within the ZnS dielectric layer for incident EMR having a wavelength of 434 nm.

Referring now to FIG. 13, Equation 55 was used to calculate that the zero or near-zero electric field point in the ZnS dielectric layer shown in FIG. 11A when exposed to EMR having a wavelength of 434 nm is at 70 nm (instead of 77 nm for a 500 nm wavelength). In addition, a 15 nm thick Cr absorber layer was inserted at a thickness of 70 nm from the Al reflector layer to afford for a zero or near-zero electric field ZnS—Cr interface. Such an inventive structure allows light having a wavelength of 434 nm to pass through the Cr—ZnS interfaces, but absorbs light not having a wavelength of 434 nm. Stated differently, the Cr—ZnS interfaces have a zero or near-zero electric field with respect to light having a wavelength of 434 nm and thus 434 nm light passes through the interfaces. However, the Cr—ZnS interfaces do not have a zero or near-zero electric field for light not having a wavelength of 434 nm and thus such light is absorbed by the Cr absorber layer and/or Cr—ZnS interfaces and not reflected by the Al reflector layer.

It is appreciated that some percentage of light within +/−10 nm of the desired 434 nm will pass through the Cr—ZnS interface. However, it is also appreciated that such a narrow band of reflected light, e.g. 434+/−10 nm, still provides a sharp structural color to a human eye.

Figure 14:
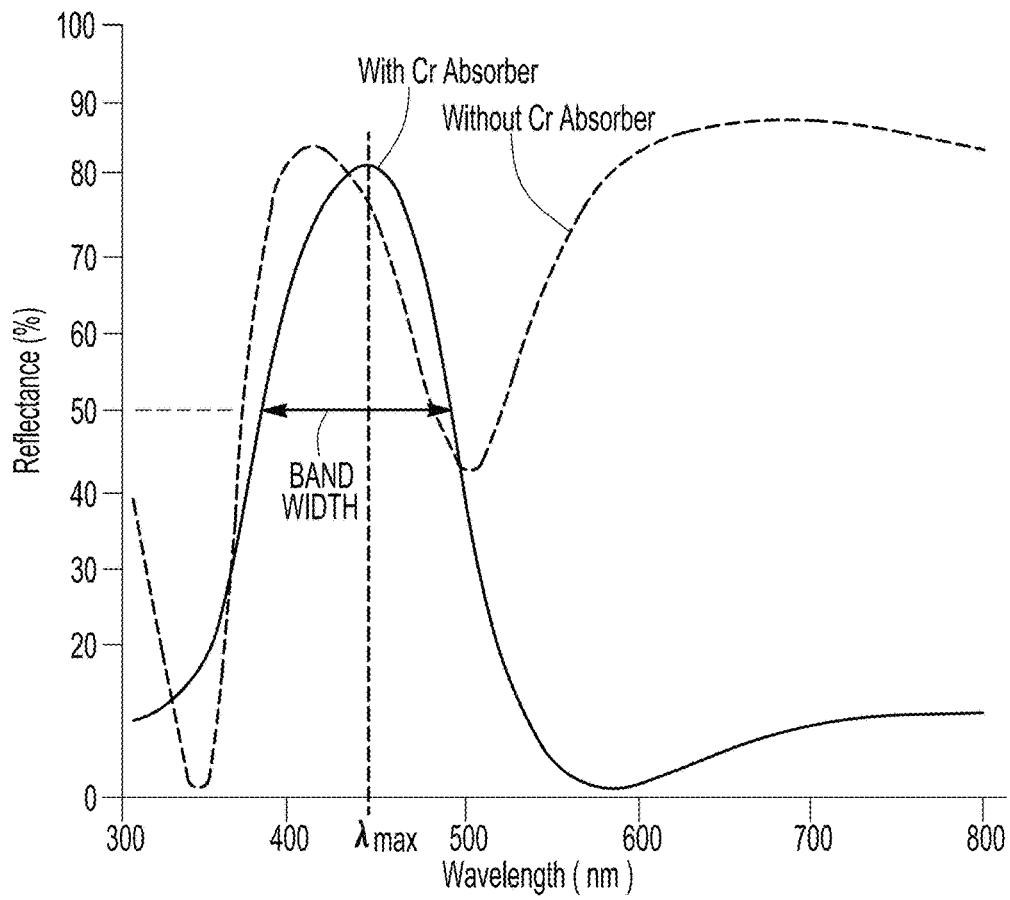
FIG. 14 is a graphical representation of percent reflectance versus reflected EMR wavelength for a multilayer stack without a Cr absorber layer (e.g., FIG. 1A) and a multilayer stack with a Cr absorber layer (e.g., FIG. 3A) exposed to white light.

The result of the Cr absorber layer in the multilayer stack in FIG. 13 is illustrated in FIG. 14 where percent reflectance versus reflected EMR wavelength is shown. As shown by the dotted line, which corresponds to the ZnS dielectric layer shown in FIG. 13 without a Cr absorber layer, a narrow reflected peak is present at about 400 nm, but a much broader peak is present at about 550+ nm. In addition, there is still a significant amount of light reflected in the 500 nm wavelength region. As such, a double peak that prevents the multilayer stack from having or exhibiting a structural color is present.

In contrast, the solid line in FIG. 14 corresponds to the structure shown in FIG. 13 with the Cr absorber layer present. As shown in the figure, a sharp peak at approximately 434 nm is present and a sharp drop off in reflectance for wavelengths greater than 434 nm is afforded by the Cr absorber layer. It is appreciated that the sharp peak represented by the solid line visually appears as sharp/structural color. Also, FIG. 14 illustrates where the width of a reflected peak or band is measured, i.e. the width of the band is determined at 50% reflectance of the maximum reflected wavelength, also known as full width at half maximum (FWHM).

Regarding omnidirectional behavior of the multilayer structure shown in FIG. 13, the thickness of the ZnS dielectric layer can be designed or set such that only the first harmonics of reflected light is provided. It is appreciated that this is sufficient for a "blue" color, however the production of a "red" color requires additional considerations. For example, the control of angular independence for red color is difficult since thicker dielectric layers are required, which in turn results in a high harmonic design, i.e. the presence of the second and possible third harmonics is inevitable. Also, the dark red color hue space is very narrow. As such, a red color multilayer stack has a higher angular variance.

Figure 15A:
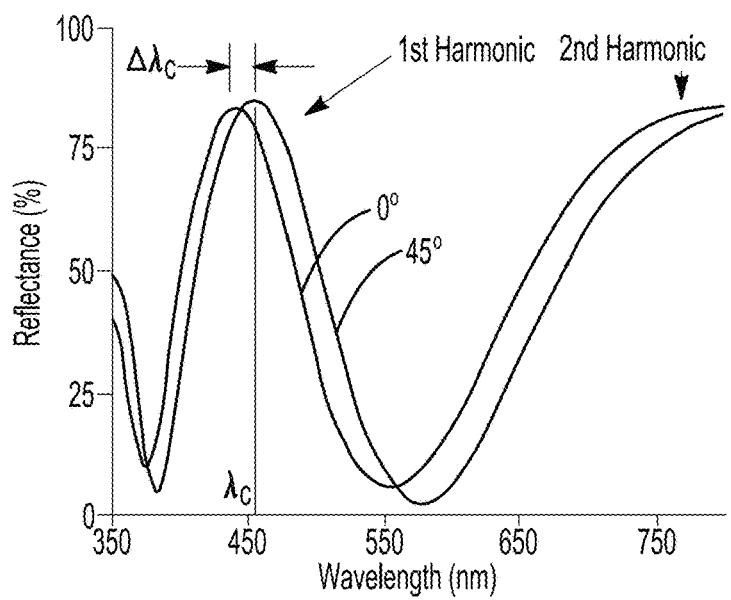
FIG. 15A is a graphical illustration of first harmonics and second harmonics exhibited by a ZnS dielectric layer extending over an Al reflector layer (e.g., FIG. 4A)

In order to overcome the higher angular variance for red color, the instant application discloses a unique and novel design/structure that affords for a red color that is angular independent. For example, FIG. 15A illustrates a dielectric layer exhibiting first and second harmonics for incident white light when an outer surface of the dielectric layer is viewed from 0 and 45 degrees. As shown by the graphical representation, low angular dependence (small A) is provided by the thickness of the dielectric layer, however, such a multilayer stack has a combination of blue color (1$^{st}$ harmonic) and red color (2$^{nd}$ harmonic) and thus is not suitable for a desired "red only" color. Therefore, the concept/structure of using an absorber layer to absorb an unwanted harmonic series has been developed. FIG. 15A also illustrates an example of the location of the reflected band center wavelength ($\lambda_c$) for a given reflection peak and the dispersion or shift of the center wavelength ($\Delta\lambda_c$) when the sample is viewed from 0 and 45 degrees.

Figure 15B:
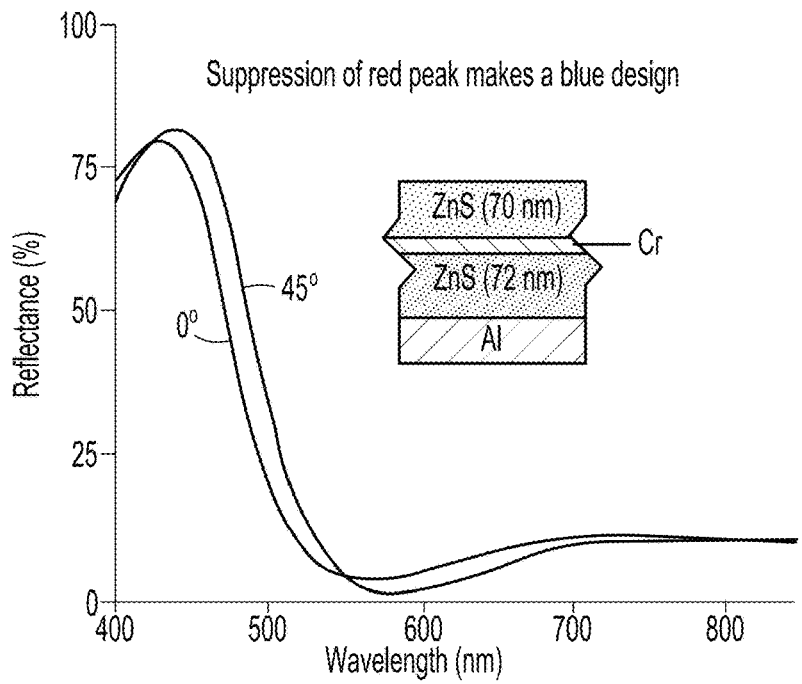
FIG. 15B is a graphical illustration of percent reflectance versus reflected EMR wavelength for a multilayer stack with a ZnS dielectric layer extending across an Al reflector layer, plus a Cr absorber layer located within the ZnS dielectric layer such that the second harmonics shown in FIG. 8A are absorbed.

Turning now to FIG. 15B, the second harmonic shown in FIG. 15A is absorbed with a Cr absorber layer at the appropriate dielectric layer thickness (e.g. 72 nm) and a sharp blue color is provided. More importantly for the instant invention, FIG. 15C illustrates that by absorbing the first harmonics with the Cr absorber at a different dielectric layer thickness (e.g. 125 nm) a red color is provided.

Figure 15C:
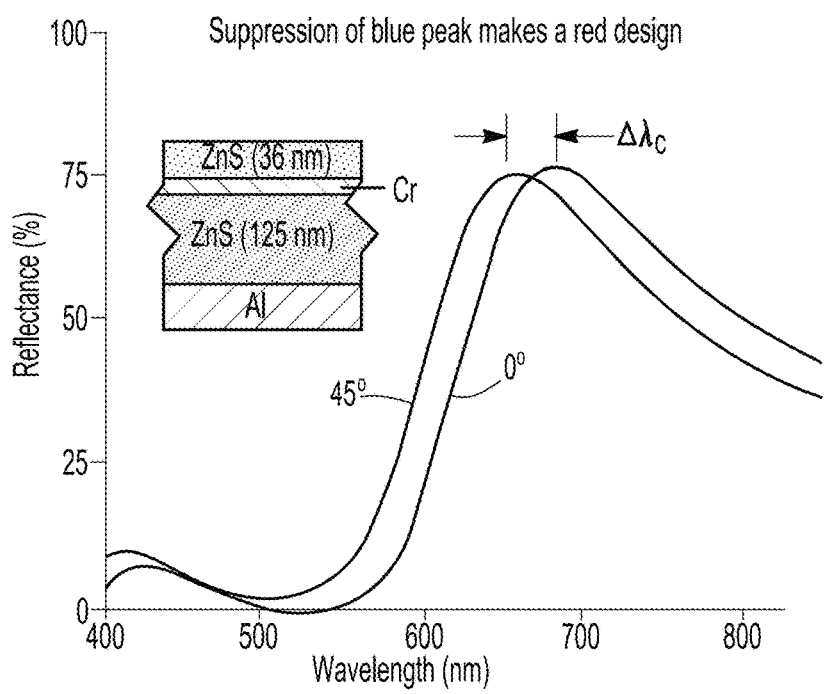
FIG. 15C is a graphical illustration of percent reflectance versus reflected EMR wavelength for a multilayer stack with a ZnS dielectric layer extending across an Al reflector layer, plus a Cr absorber layer located within the ZnS dielectric layer such that the first harmonics shown in FIG. 8A are absorbed.

However, FIG. 15C also illustrates that the use of the Cr absorber layer can result in more than desired angular dependence by the multilayer stack, i.e. a larger than desired $\Delta\lambda_c$.

Figure 16A:
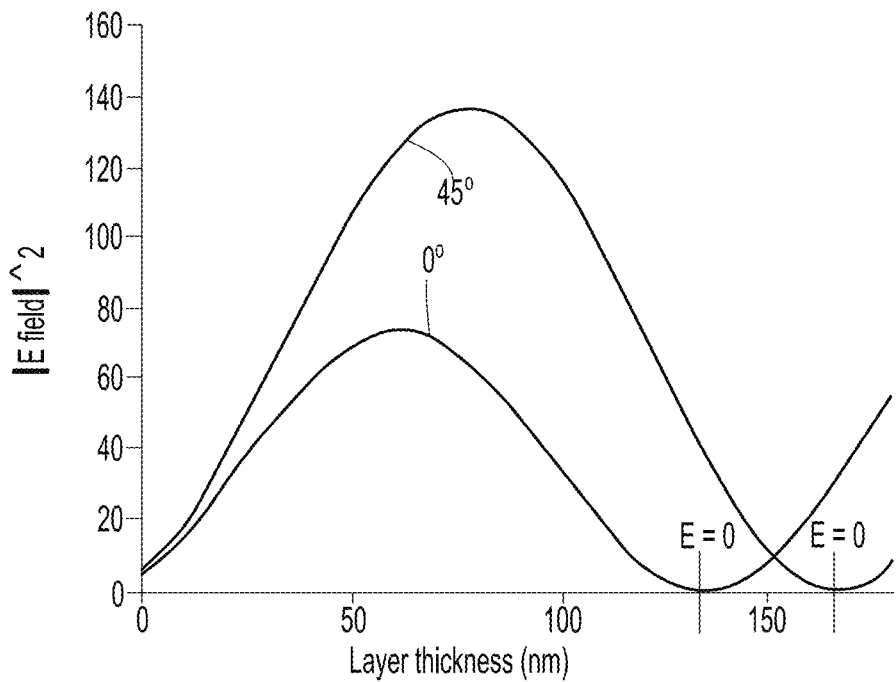
FIG. 16A is a graphical illustration of electric field squared versus dielectric layer thickness showing the electric field angular dependence of a Cr absorber layer for exposure to incident light at 0 and 45 degrees.

It is appreciated that the relatively large shift in $\lambda_c$ for the red color compared to the blue color is due to the dark red color hue space being very narrow and the fact that the Cr absorber layer absorbs wavelengths associated with a non-zero electric field, i.e. does not absorb light when the electric field is zero or near-zero. As such, FIG. 16A illustrates that the zero or non-zero point is different for light wavelengths at different incident angles. Such factors result in the angular dependent absorbance shown in FIG. 16B, i.e. the difference in the 0° and 45° absorbance curves. Thus in order to further refine the multilayer stack design and angular independence performance, an absorber layer that absorbs, e.g. blue light, irrespective of whether or not the electric field is zero or not, is used.

Figure 16B:
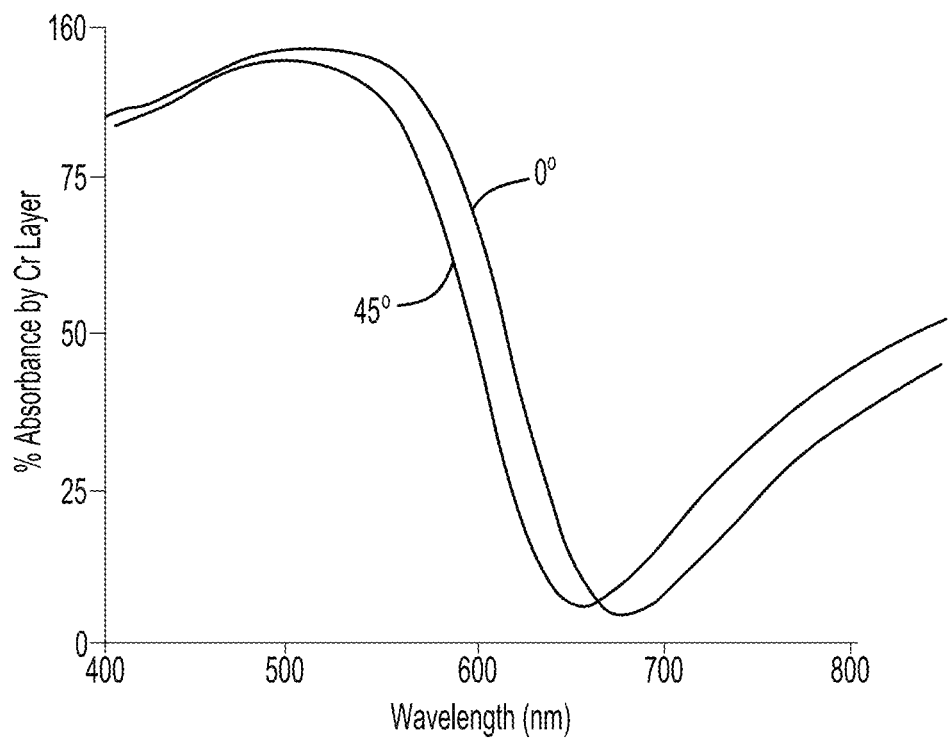
FIG. 16B is a graphical illustration of percent absorbance by a Cr absorber layer versus reflected EMR wavelength when exposed to white light at 0 and 45° angles relative to normal of the outer surface (0° being normal to surface)
Figure 17A:
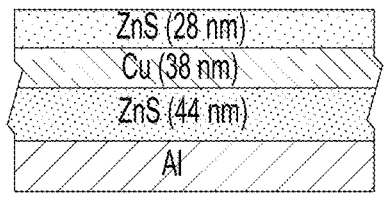
FIG. 17A is a schematic illustration of a red omnidirectional structural color multilayer stack according to an embodiment of the present invention.
Figure 17B:
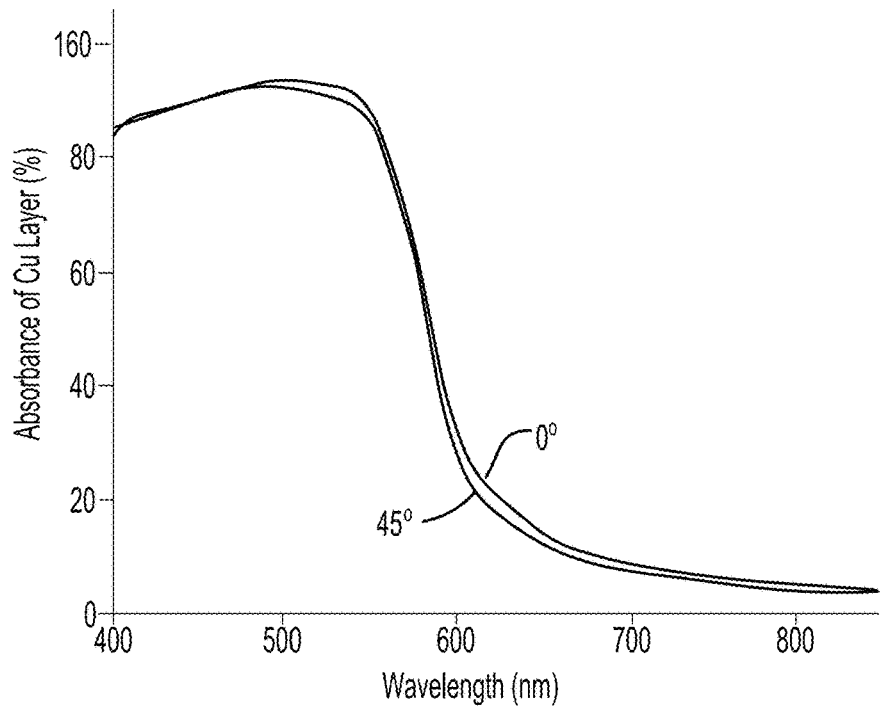
FIG. 17B is a graphical illustration of percent absorbance of the Cu absorber layer shown in FIG. 10A versus reflected EMR wavelength for white light exposure to the multilayer stack shown in FIG. 10A at incident angles of 0 and 45°.

In particular, FIG. 17A shows a multilayer stack with a Cu absorber layer instead of a Cr absorber layer extending across a dielectric ZnS layer. The results of using such a "colorful" or "selective" absorber layer is shown in FIG. 17B which demonstrates a much "tighter" grouping of the 0° and 45° absorbance lines for the multilayer stack shown in FIG. 17A. As such, a comparison between FIG. 16B and FIG. 16B illustrates the significant improvement in absorbance angular independence when using a selective absorber layer rather than non-selective absorber layer.

Based on the above, a proof of concept multilayer stack structure was designed and manufactured. In addition, calculation/simulation results and actual experimental data for the proof of concept sample were compared. In particular, and as shown by the graphical plot in FIG. 18, a sharp red color was produced (wavelengths greater than 700 nm are not typically seen by the human eye) and very good agreement was obtained between the calculation/simulation and experimental light data obtained from the actual sample. Stated differently, calculations/simulations can and/or are used to simulate the results of multilayer stack designs according to one or more embodiments of the present invention and/or prior art multilayer stacks.

A list of simulated and/or actually produced multilayer stack samples is provided in the Table 1 below. As shown in the table, the inventive designs disclosed herein include at least 5 different layered structures. In addition, the samples were simulated and/or made from a wide range of materials. Samples that exhibited high chroma, low hue shift and excellent reflectance were provided. Also, the three and five layer samples had an overall thickness between 120-200 nm; the seven layer samples had an overall thickness between 350-600 nm; the nine layer samples had an overall thickness between 440-500 nm; and the eleven layer samples had an overall thickness between 600-660 nm.

TABLE 1

|  | Ave. Chroma (0-45) | Δh (0-65) | Max. Reflectance | Sample Name |
|---|---|---|---|---|
| 3 layer | 90 | 2 | 96 | 3-1 |
| 5 layer | 91 | 3 | 96 | 5-1 |
| 7 layer | 88 | 1 | 92 | 7-1 |
|  | 91 | 3 | 92 | 7-2 |
|  | 91 | 3 | 96 | 7-3 |
|  | 90 | 1 | 94 | 7-4 |
|  | 82 | 4 | 75 | 7-5 |
|  | 76 | 20 | 84 | 7-6 |

TABLE 1-continued

|  | Ave. Chroma (0-45) | Δh (0-65) | Max. Reflectance | Sample Name |
|---|---|---|---|---|
| 9 layer | 71 | 21 | 88 | 9-1 |
|  | 95 | 0 | 94 | 9-2 |
|  | 79 | 14 | 86 | 9-3 |
|  | 90 | 4 | 87 | 9-4 |
|  | 94 | 1 | 94 | 9-5 |
|  | 94 | 1 | 94 | 9-6 |
|  | 73 | 7 | 87 | 9-7 |
| 11 layer | 88 | 1 | 84 | 11-1 |
|  | 92 | 1 | 93 | 11-2 |
|  | 90 | 3 | 92 | 11-3 |
|  | 89 | 9 | 90 | 11-4 |

Figure 19:
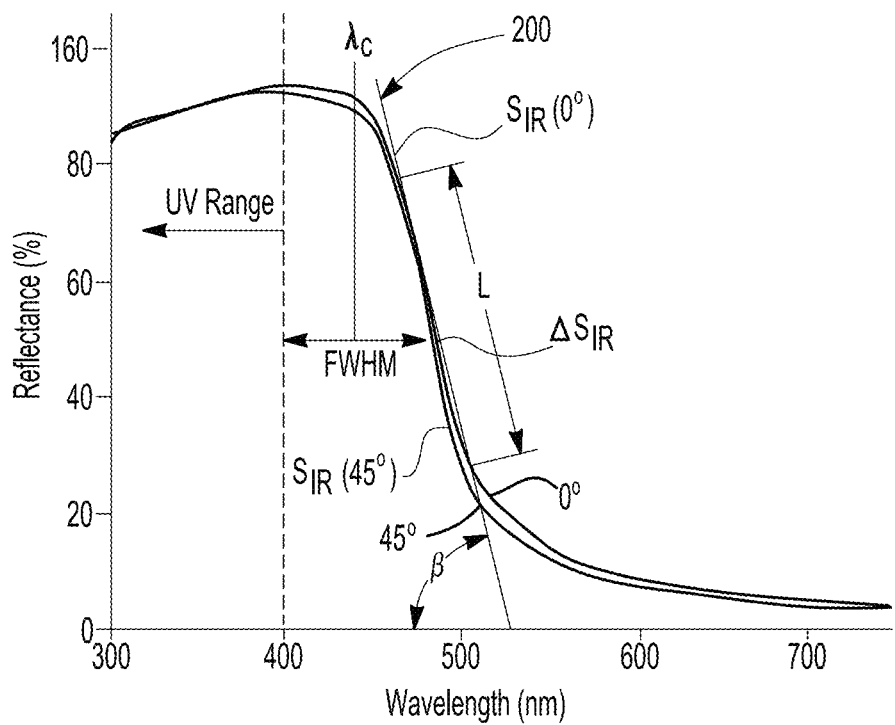
FIG. 19 is a graphical illustration of percent reflectance versus wave length for an omnidirectional structural color multilayer stack according to an embodiment of the present invention.

Turning now to FIG. 19, a plot of percent reflectance versus reflected EMR wavelength is shown for an omnidirectional reflector when exposed to white light at angles of 0 and 45° relative to the surface of the reflector. As shown by the plot, both the 0° and 45° curves illustrate very low reflectance, e.g. less than 20%, provided by the omnidirectional reflector for wavelengths greater than 500 nm. However, the reflector, as shown by the curves, provides a sharp increase in reflectance at wavelengths between 400-500 nm and reaches a maximum of approximately 90% at 450 nm. It is appreciated that the portion or region of the graph on the left hand side (UV side) of the curve represents the UV-portion of the reflection band provided by the reflector.

The sharp increase in reflectance provided by the omnidirectional reflector is characterized by an IR-sided edge of each curve that extends from a low reflectance portion at wavelengths greater than 500 nm up to a high reflectance portion, e.g. >70%. A linear portion 200 of the IR-sided edge is inclined at an angle (β) greater than 60° relative to the x-axis, has a length L of approximately 50 on the Reflectance-axis and a slope of 1.2. In some instances, the linear portion is inclined at an angle greater than 70° relative to the x-axis, while in other instances β is greater than 75°. Also, the reflection band has a visible FWHM of less than 200 nm, and in some instances a visible FWHM of less than 150 nm, and in other instances a visible FWHM of less than 100 nm. In addition, the center wavelength $\lambda_c$ for the visible reflection band as illustrated in FIG. 19 is defined as the wavelength that is equal-distance between the IR-sided edge of the reflection band and the UV edge of the UV spectrum at the visible FWHM.

It is appreciated that the term "visible FWHM" refers to the width of the reflection band between the IR-sided edge of the curve and the edge of the UV spectrum range, beyond which reflectance provided by the omnidirectional reflector is not visible to the human eye. In this manner, the inventive designs and multilayer stacks disclosed herein use the non-visible UV portion of the electromagnetic radiation spectrum to provide a sharp or structural color. Stated differently, the omnidirectional reflectors disclosed herein take advantage of the non-visible UV portion of the electromagnetic radiation spectrum in order to provide a narrow band of reflected visible light, despite the fact that the reflectors may reflect a much broader band of electromagnetic radiation that extends into the UV region.

Figure 20:
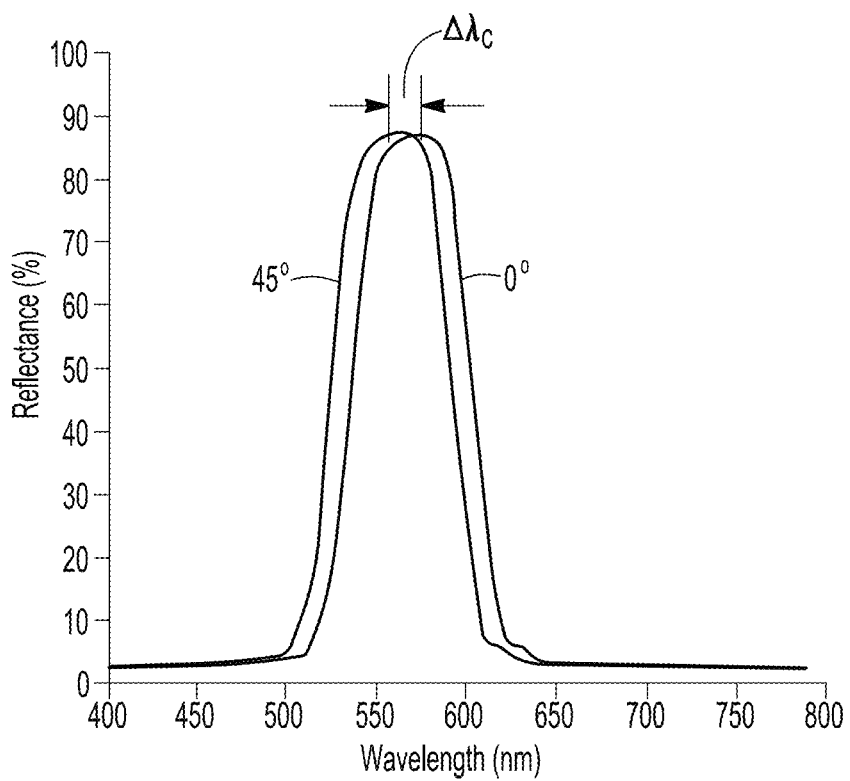
FIG. 20 is a graphical illustration of percent reflectance versus wave length for an omnidirectional structural color multilayer stack according to an embodiment of the present invention.

Turning now to FIG. 20, a generally symmetrical reflection band provided by a multilayer stack according to an embodiment of the present invention and when viewed at 0° and 45° is shown. As illustrated in the figure, the reflection band provided by the multilayer stack when viewed at 0° has a center wavelength ($\lambda_c(0°)$) shifts less than 50 nm when the multilayer stack is viewed at 45° ($\lambda_c(45°)$), i.e. $\Delta\lambda_c(0\text{-}45°)$ <50 nm. In addition, the FWHM of both the 0° reflection band and the 45° reflection band is less than 200 nm.

Figure 21:
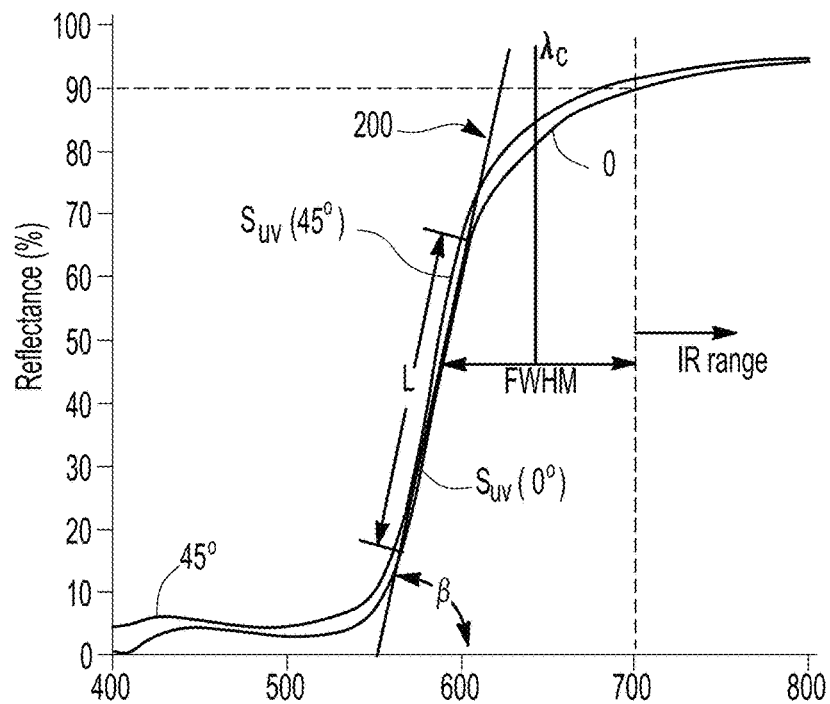
FIG. 21 is a graphical illustration of percent reflectance versus wave length for an omnidirectional structural color multilayer stack according to an embodiment of the present invention.

FIG. 21 shows a plot of percent reflectance versus reflected EMR wavelength for another omnidirectional reflector design when exposed to white light at angles of 0 and 45° relative to the surface of the reflector. Similar to FIG. 19, and as shown by the plot, both the 0° and 45° curves illustrate very low reflectance, e.g. less than 10%, provided by the omnidirectional reflector for wavelengths less than 550 nm. However, the reflector, as shown by the curves, provides a sharp increase in reflectance at wavelengths between 560-570 nm and reaches a maximum of approximately 90% at 700 nm. It is appreciated that the portion or region of the graph on the right hand side (IR side) of the curve represents the IR-portion of the reflection band provided by the reflector.

Figure 18:
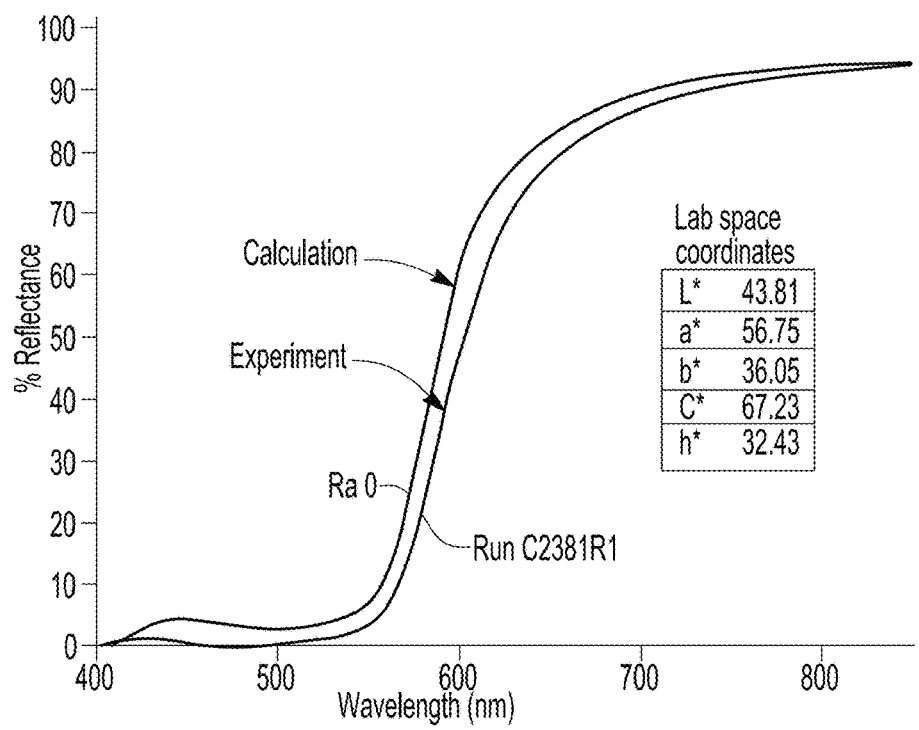
FIG. 18 is a graphical comparison between calculation/simulation data and experimental data for percent reflectance versus reflected EMR wavelength for a proof of concept red omnidirectional structural color multilayer stack exposed to white light at an incident angle of 0°.

The sharp increase in reflectance provided by the omnidirectional reflector is characterized by a UV-sided edge of each curve that extends from a low reflectance portion at wavelengths below 550 nm up to a high reflectance portion, e.g. >70%. A linear portion 200 of the UV-sided edge is inclined at an angle ($\beta$) greater than 60° relative to the x-axis, has a length L of approximately 40 on the Reflectance-axis and a slope of 1.4. In some instances, the linear portion is inclined at an angle greater than 70° relative to the x-axis, while in other instances $\beta$ is greater than 75°. Also, the reflection band has a visible FWHM of less than 200 nm, and in some instances a visible FWHM of less than 150 nm, and in other instances a visible FWHM of less than 100 nm. In addition, the center wavelength $\lambda_c$ for the visible reflection band as illustrated in FIG. 18 is defined as the wavelength that is equal-distance between the UV-sided edge of the reflection band and the IR edge of the IR spectrum at the visible FWHM.

It is appreciated that the term "visible FWHM" refers to the width of the reflection band between the UV-sided edge of the curve and the edge of the IR spectrum range, beyond which reflectance provided by the omnidirectional reflector is not visible to the human eye. In this manner, the inventive designs and multilayer stacks disclosed herein use the non-visible IR portion of the electromagnetic radiation spectrum to provide a sharp or structural color. Stated differently, the omnidirectional reflectors disclosed herein take advantage of the non-visible IR portion of the electromagnetic radiation spectrum in order to provide a narrow band of reflected visible light, despite the fact that the reflectors may reflect a much broader band of electromagnetic radiation that extends into the IR region.

Figure 22:
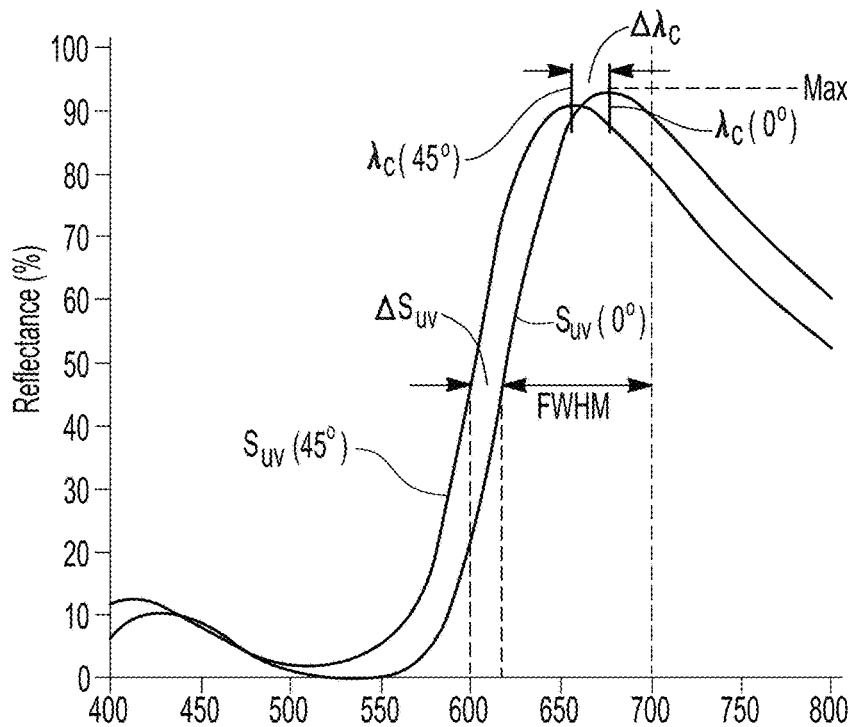
FIG. 22 is a graphical illustration of percent reflectance versus wave length for an omnidirectional structural color multilayer stack according to an embodiment of the present invention.

Referring now to FIG. 22, a plot of percent reflectance versus wavelength is shown for another seven-layer design omnidirectional reflector when exposed to white light at angles of 0 and 45° relative to the surface of the reflector. In addition, a definition or characterization of omnidirectional properties provided by omnidirectional reflectors disclosed herein is shown. In particular, and when the reflection band provided by an inventive reflector has a maximum, i.e. a peak, as shown in the figure, each curve has a center wavelength ($\lambda_c$) defined as the wavelength that exhibits or experiences maximum reflectance. The term maximum reflected wavelength can also be used for $\lambda_c$.

As shown in FIG. 22, there is shift or displacement of $\lambda_c$ when an outer surface of the omnidirectional reflector is observed from an angle 45° ($\lambda_c(45°)$), e.g. the outer surface is tiled 45° relative to a human eye looking at the surface, compared to when the surface is observed from an angle of 0° (($\lambda_c(0°)$), i.e. normal to the surface. This shift of $\lambda_c$ ($\Delta\lambda_c$) provides a measure of the omnidirectional property of the omnidirectional reflector. Naturally a zero shift, i.e. no shift at all, would be a perfectly omnidirectional reflector. However, omnidirectional reflectors disclosed herein can provide a $\Delta\lambda_c$ of less than 50 nm, which to the human eye can appear as though the surface of the reflector has not changed color and thus from a practical perspective the reflector is omnidirectional. In some instances, omnidirectional reflectors disclosed herein can provide a $\Delta\lambda_c$ of less than 40 nm, in other instances a $\Delta\lambda_c$ of less than 30 nm, and in still other instances a $\Delta\lambda_c$ of less than 20 nm, while in still yet other instances a $\Delta\lambda_c$ of less than 15 nm. Such a shift in $\Delta\lambda_c$ can be determined by an actual reflectance versus wavelength plot for a reflector, and/or in the alternative, by modeling of the reflector if the materials and layer thicknesses are known.

Another definition or characterization of a reflector's omnidirectional properties can be determined by the shift of a side edge for a given set of angle refection bands. For example, and with reference to FIG. 19, a shift or displacement of an IR-sided edge ($\Delta S_{IR}$) for reflectance from an omnidirectional reflector observed from 0° ($S_{IR}(0°)$) compared to the IR-sided edge for reflectance by the same reflector observed from 45° ($S_{IR}(45°)$) provides a measure of the omnidirectional property of the omnidirectional reflector. In addition, using $\Delta S_{IR}$ as a measure of omnidirectionality can be preferred to the use of $\Delta\lambda_c$, e.g. for reflectors that provide a reflectance band similar to the one shown in FIG. 19, i.e. a reflection band with a peak corresponding to a maximum reflected wavelength that is not in the visible range (see FIGS. 19 and 21). It is appreciated that the shift of the IR-sided edge ($\Delta S_{IR}$) is and/or can be measured at the visible FWHM.

With reference to FIG. 21, a shift or displacement of a UV-sided edge ($\Delta S_{IR}$) for reflectance from an omnidirectional reflector observed from 0° ($S_{UV}(0°)$) compared to the IR-sided edge for reflectance by the same reflector observed from 45° ($S_{UV}(45°)$) provides a measure of the omnidirectional property of the omnidirectional reflector. It is appreciated that the shift of the UV-sided edge ($\Delta S_{UV}$) is and/or can be measured at the visible FWHM.

Naturally a zero shift, i.e. no shift at all ($\Delta S_i$=0 nm; i=IR, UV), would characterize a perfectly omnidirectional reflector. However, omnidirectional reflectors disclosed herein can provide a $\Delta S_L$ of less than 50 nm, which to the human eye can appear as though the surface of the reflector has not changed color and thus from a practical perspective the reflector is omnidirectional. In some instances, omnidirectional reflectors disclosed herein can provide a $\Delta S_i$ of less than 40 nm, in other instances a $\Delta S_i$ of less than 30 nm, and in still other instances a $\Delta S_i$ of less than 20 nm, while in still yet other instances a $\Delta S_i$ of less than 15 nm. Such a shift in $\Delta S_i$ can be determined by an actual reflectance versus wavelength plot for a reflector, and/or in the alternative, by modeling of the reflector if the materials and layer thicknesses are known.

Figure 23:
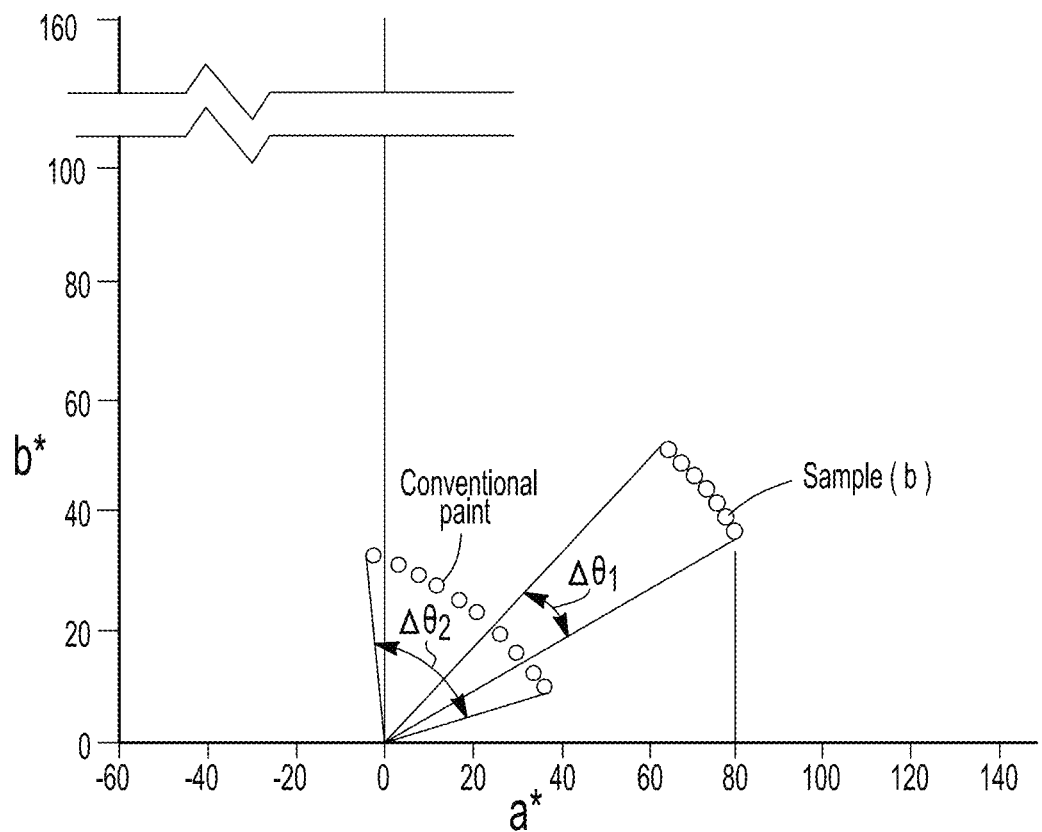
FIG. 23 is a graphical representation of a portion of an a*b* color map using the CIELAB color space in which the chroma and hue shift are compared between a conventional paint and a paint made from pigments according to an embodiment of the present invention (Sample (b))

The shift of an omnidirectional reflection can also be measured by a low hue shift. For example, the hue shift of pigments manufactured from multilayer stacks according an embodiment of the present invention is 30° or less, as shown in FIG. 23 (see $\Delta\theta_1$), and in some instances the hue shift is 25° or less, preferably less than 20°, more preferably less than 15° and still more preferably less than 10°. In contrast, traditional pigments exhibit hue shift of 45° or more (see $\Delta\theta_2$).

Figure 24:
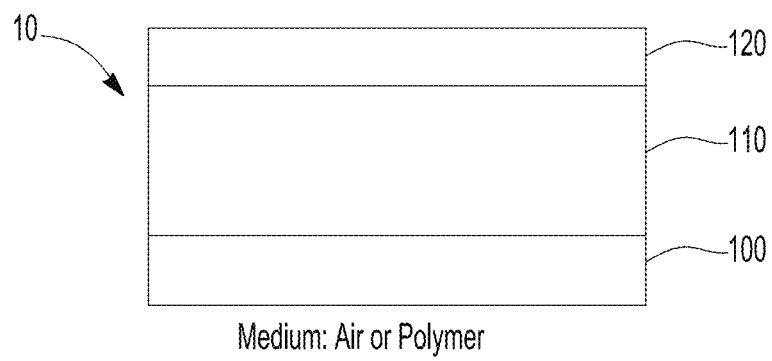
FIG. 24 is a schematic illustration of an omnidirectional structural color multilayer stack according to an embodiment of the present invention.

In summary, a schematic illustration of an omnidirectional multilayer thin film according to an embodiment of the present invention in which a first layer 110 has a second layer 120 extending thereacross is shown in FIG. 24. An optional reflector layer 100 can be included. Also, a symmetric pair of layers can be on an opposite side of the reflector layer 100, i.e. the reflector layer 100 can have a first layer 110 oppositely disposed from the layer 110 shown in the figure such that the reflector layer 100 is sandwiched between a pair of first layers 110. In addition, a second layer 120 can be oppositely disposed the reflector layer 100 such that a five-layer structure is provided. Therefore, it should be appreciated that the discussion of the multilayer thin films provided herein also includes the possibility of a mirror structure with respect to one or more central layers. As such, FIG. 24 can be illustrative of half of a five-layer multilayer stack.

The first layer 110 and second layer 120 can be dielectric layers, i.e. made from a dielectric material. In the alternative, one of the layers can be an absorbing layer, e.g. a selective absorbing layer or a non-selective absorbing layer. For example, the first layer 110 can be a dielectric layer and the second layer 120 can be an absorbing layer.

Figure 25:
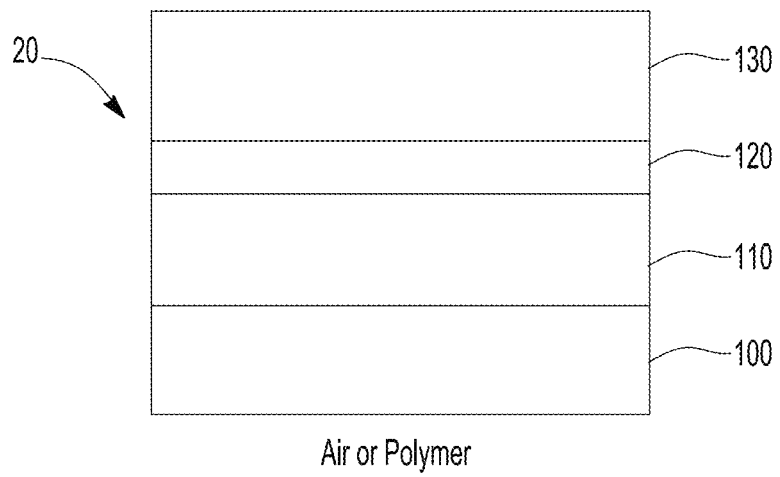
FIG. 25 is a schematic illustration of an omnidirectional structural color multilayer stack according to an embodiment of the present invention.

FIG. 25 illustrates half of a seven-layer design at reference numeral 20. The multilayer stack 20 has an additional layer 130 extending across the second layer 120. For example, the additional layer 130 can be a dielectric layer that extends across an absorbing layer 120. It is appreciated that layer 130 can be the same or a different material as layer 110. For example, the additional layer 130 can be formed from a dielectric material or a selective absorbing material that is a different material than the first layer. In addition, layer 130 can be added onto the multilayer stack 20 using the same or a different method to apply layers 100, 110 and/or 120 such as with a sol gel process.

Figure 26:
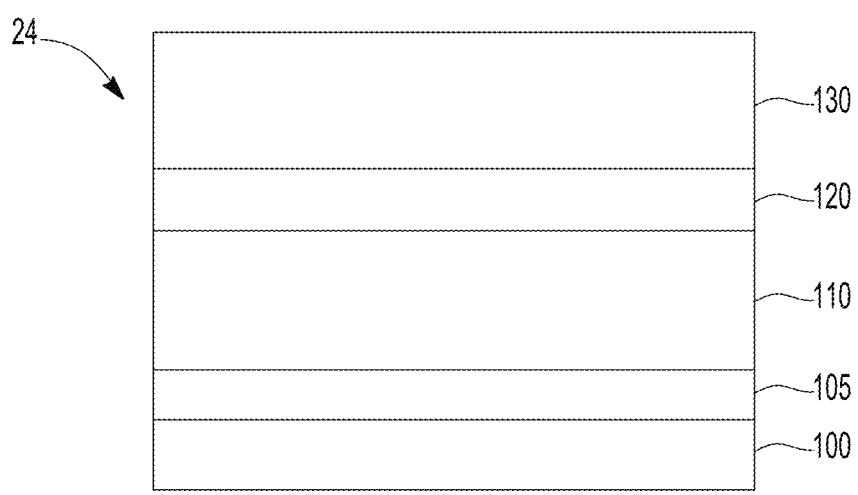
FIG. 26 is a schematic illustration of an omnidirectional structural color multilayer stack according to an embodiment of the present invention.

FIG. 26 illustrates half of a nine-layer design at reference numeral 24 in which yet an additional layer 105 is located between the optional reflector layer 100 and the first layer 110. For example, the additional layer 105 can be an absorbing layer 105 that extends between the reflector layer 100 and a dielectric layer 110. A non-exhaustive list of materials that the various layers can be made from are shown is shown in Table 2 below.

TABLE 2

| Refractive Index Materials (visible region) | | Refractive Index Materials (visible region) | |
|---|---|---|---|
| Material | Refractive Index | Material | Refractive Index |
| Germanium (Ge) | 4.0-5.0 | Chromium (Cr) | 3.0 |
| Tellurium (Te) | 4.6 | Tin Sulfide (SnS) | 2.6 |
| Gallium Antimonite (GaSb) | 4.5-5.0 | Low Porous Si | 2.56 |
| Indium Arsenide (InAs) | 4.0 | Chalcogenide glass | 2.6 |
| Silicon (Si) | 3.7 | Cerium Oxide ($CeO_2$) | 2.53 |
| Indium Phosphate (InP) | 3.5 | Tungsten (W) | 2.5 |
| Gallium Arsenate (GaAs) | 3.53 | Gallium Nitride (GaN) | 2.5 |
| Gallium Phosphate (GaP) | 3.31 | Manganese (Mn) | 2.5 |
| Vanadium (V) | 3 | Niobium Oxide ($Nb_2O_3$) | 2.4 |
| Arsenic Selenide ($As_2Se_3$) | 2.8 | Zinc Telluride (ZnTe) | 3.0 |
| $CuAlSe_2$ | 2.75 | Chalcogenide glass + Ag | 3.0 |
| Zinc Selenide (ZnSe) | 2.5-2.6 | Zinc Sulfate (ZnSe) | 2.5-3.0 |
| Titanium Dioxide ($TiO_2$) - solgel | 2.36 | Titanium Dioxide ($TiO_2$) - vacuum deposited | 2.43 |
| Alumina Oxide (Al2O3) | 1.75 | Hafnium Oxide ($HfO_2$) | 2.0 |
| Yttrium Oxide (Y2O3) | 1.75 | Sodium Aluminum Fluoride (Na3AlF6) | 1.6 |
| Polystyrene | 1.6 | Polyether Sulfone (PES) | 1.55 |
| Magnesium Fluoride (MgF2) | 1.37 | High Porous Si | 1.5 |
| Lead Fluoride (PbF2) | 1.6 | Indium Tin Oxide nanorods (ITO) | 1.46 |
| Potassium Fluoride (KF) | 1.5 | Lithium Fluoride (LiF4) | 1.45 |
| Polyethylene (PE) | 1.5 | Calcium Fluoride | 1.43 |
| Barium Fluoride (BaF2) | 1.5 | Strontium Fluoride (SrF2) | 1.43 |
| Silica (SiO2) | 1.5 | Lithium Fluoride (LiF) | 1.39 |
| PMMA | 1.5 | PKFE | 1.6 |
| Aluminum Arsenate (AlAs) | 1.56 | Sodium Fluoride (NaF) | 1.3 |
| Solgel Silica (SiO2) | 1.47 | Nano-porous Silica (SiO2) | 1.23 |
| N,N' bis(1naphthyl)-4,4'Diamine (NPB) | 1.7 | Sputtered Silica (SiO2) | 1.47 |
| Polyamide-imide (PEI) | 1.6 | Vacuum Deposited Silica (SiO2) | 1.46 |
| Zinc Sulfide (ZnS) | 2.3 + i(0.015) | Niobium Oxide ($Nb_2O_5$) | 2.1 |
| Titanium Nitride (TiN) | 1.5 + i(2.0) | Aluminum (Al) | 2.0 + i(15) |
| Chromium (Cr) | 2.5 + i(2.5) | Silicon Nitride (SiN) | 2.1 |
| Niobium Pentoxide(Nb2O5) | 2.4 | Mica | 1.56 |
| Zirconium Oxide (ZrO2) | 2.36 | Polyallomer | 1.492 |
| Hafnium Oxide (HfO2) | 1.9-2.0 | Polybutylene | 1.50 |
| Fluorcarbon (FEP) | 1.34 | Ionomers | 1.51 |
| Polytetrafluro-Ethylene (TFE) | 1.35 | Polyethylene (Low Density) | 1.51 |
| Fluorcarbon (FEP) | 1.34 | Nylons (PA) Type II | 1.52 |
| Polytetrafluro-Ethylene(TFE) | 1.35 | Acrylics Multipolymer | 1.52 |
| Chlorotrifluoro-Ethylene(CTFE) | 1.42 | Polyethylene (Medium Density) | 1.52 |

TABLE 2-continued

| Refractive Index Materials (visible region) | | Refractive Index Materials (visible region) | |
|---|---|---|---|
| Material | Refractive Index | Material | Refractive Index |
| Cellulose Propionate | 1.46 | Styrene Butadiene Thermoplastic | 1.52-1.55 |
| Cellulose Acetate Butyrate | 1.46-1.49 | PVC (Rigid) | 1.52-1.55 |
| Cellulose Acetate | 1.46-1.50 | Nylons (Polyamide) Type 6/6 | 1.53 |
| Methylpentene Polymer | 1.485 | Urea Formaldehyde | 1.54-1.58 |
| Acetal Homopolymer | 1.48 | Polyethylene (High Density) | 1.54 |
| Acrylics | 1.49 | Styrene Acrylonitrile Copolymer | 1.56-1.57 |
| Cellulose Nitrate | 1.49-1.51 | Polystyrene (Heat & Chemical) | 1.57-1.60 |
| Ethyl Cellulose | 1.47 | Polystyrene (General Purpose) | 1.59 |
| Polypropylene | 1.49 | Polycarbornate (Unfilled) | 1.586 |
| Polysulfone | 1.633 | SnO2 | 2.0 |

Methods for producing the multilayer stacks disclosed herein can be any method or process known to those skilled in the art or one or methods not yet known to those skilled in the art. Typical known methods include wet methods such as sol gel processing, layer-by-layer processing, spin coating and the like. Other known dry methods include chemical vapor deposition processing and physical vapor deposition processing such as sputtering, electron beam deposition and the like.

The multilayer stacks disclosed herein can be used for most any color application such as pigments for paints, thin films applied to surfaces and the like.

The above examples and embodiments are for illustrative purposes only and changes, modifications, and the like will be apparent to those skilled in the art and yet still fall within the scope of the invention. As such, the scope of the invention is defined by the claims and all equivalents thereof.

We claim:

1. A multilayer thin film that reflects an omnidirectional structural color comprising: a multilayer stack comprising a reflector layer, a first layer extending over the reflector layer, a second layer extending over the first layer and a third layer extending over the second layer, wherein the first layer is formed from a dielectric material, the second layer is formed from an absorbing material, and the third layer is formed from a selective absorbing material that is a different material than the first layer, wherein the first layer is a dielectric layer formed from at least one of $SiO_2$, $TiO_2$, ZnS, and $MgF_2$, the second layer is formed from at least one of Cr, Ta, W, Mo, Ti, TiN, Nb, Co, Si, Ge, Ni, Pd, and V, the third layer is a selective absorbing layer formed from at least one of $Fe_2O_3$, $Cu_2O$, amorphous Si, and crystalline Si, and the multilayer thin film reflects a single narrow band of visible light when exposed to broadband electromagnetic radiation, the single narrow band of visible light comprising: a center wavelength greater than 550 nm; a visible full width at half maximum (FWHM) width of less than 200 nm; a color shift of the reflected single narrow band of visible light is less than 50 nm when the multilayer stack is exposed to broadband electromagnetic radiation and viewed from angles between 0 and 45 degrees relative to a direction normal to an outer surface of the multilayer thin film.

2. The multilayer thin film of claim 1, wherein the first layer is formed from ZnS, the second layer is formed from Cr, and the third layer is formed from $Fe_2O_3$.

3. The multilayer thin film of claim 1, wherein the first layer has a thickness between 30-300 nm, the second layer has a thickness between 5-20 nm and the third layer has a thickness between 20-80 nm.

4. The multilayer thin film of claim 1, wherein the reflected single narrow band of visible light has a hue shift of less than or equal to 30° on the CIELAB color space when the multilayer thin film is viewed at angles between 0 and 45 degrees relative to a direction normal to an outer surface of the multilayer thin film.

5. The multilayer thin film of claim 4, wherein the hue shift is less than 25° when the multilayer stack is exposed to broadband electromagnetic radiation and viewed from angles between 0 and 45 degrees.

6. The multilayer thin film of claim 1, wherein the multilayer stack reflects electromagnetic radiation in the IR range.

7. The multilayer thin film of claim 1, wherein the multilayer stack reflects a color with a chroma greater than or equal to 76 and less than or equal to 91.

8. A multilayer thin film that reflects an omnidirectional structural color comprising:

a multilayer stack comprising a reflector layer, a dielectric layer extending over the reflector layer, an absorbing layer extending over the dielectric layer and a selective absorbing layer extending of the absorbing layer, wherein the dielectric layer is formed from at least one of $SiO_2$, $TiO_2$, ZnS, and $MgF_2$, the absorbing layer is formed from at least one of Cr, Ta, W, Mo, Ti, TiN, Nb, Co, Si, Ge, Ni, Pd, and V, the selective absorbing layer is formed from at least one of $Fe_2O_3$, $Cu_2O$, amorphous Si, and crystalline Si, and the multilayer thin film reflects visible light and IR radiation when exposed to broadband electromagnetic radiation, the reflected visible light being a single narrow band of visible light comprising:

a center wavelength greater than 550 nm;

a visible full width at half maximum (FWHM) width of less than 200 nm; and a color shift of the reflected single narrow band of visible light is less than 50 nm when the multilayer stack is exposed to broadband electromagnetic radiation and viewed from angles between 0 and 45 degrees relative to a direction normal to an outer surface of the multilayer thin film.

9. The multilayer thin film of claim 8, wherein the dielectric layer is formed from ZnS, the absorbing layer is formed from Cr, and the selective absorbing layer is formed from $Fe_2O_3$.

10. The multilayer thin film of claim 8, wherein the reflected single narrow band of visible light has a hue shift of less than or equal to 30° on the CIELAB color space when the multilayer thin film is viewed at angles between 0 and 45 degrees relative to a direction normal to an outer surface of the multilayer thin film.

\* \* \* \* \*

UNITED STATES PATENT AND TRADEMARK OFFICE
CERTIFICATE OF CORRECTION

PATENT NO. : 11,086,053 B2
APPLICATION NO. : 15/722514
DATED : August 10, 2021
INVENTOR(S) : Debasish Banerjee, Minjuan Zhang and Masahiko Ishii Page 1 of 1

It is certified that error appears in the above-identified patent and that said Letters Patent is hereby corrected as shown below:

On the Title Page

Item (71), applicant 2, city, delete "Toyota" and insert --Toyota-shi Aichi-ken--, therefor.

Item (72), inventor 3, city, delete "Okazaki" and insert --Okazaki City Aichi--, therefor.

Item (73), assignee 2, address, insert --Toyota-shi Aichi-ken (JP)--.

In page 2, Column 2, item (56), U.S. patent documents, cite no. 66, delete "3013383" and insert --8013383--, therefor.

In page 4, Column 1, item (56), other documents, cite no. 3, delete "Mar. 1, 2015." and insert --Mar. 4, 2015.--, therefor.

In the Specification

In Column 5, Line(s) 11, after "2", insert --μm--.

In Column 5, Line(s) 11, after "1.5", insert --μm--.

In Column 5, Line(s) 12, after "1.0", insert --μm--.

In Column 14, Line(s) 50, after "(small", delete "A)" and insert --$\Delta\lambda_c$)--, therefor.

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*